(12) United States Patent
Quan

(10) Patent No.: US 8,374,490 B2
(45) Date of Patent: Feb. 12, 2013

(54) METHOD AND APPARATUS FOR RECEIVING METADATA, EPG, OR IPG SIGNALS IN AN INTEGRATED CIRCUIT FOR CONTROL PURPOSES

(75) Inventor: Ronald Quan, Cupertino, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 214 days.

(21) Appl. No.: 12/711,834

(22) Filed: Feb. 24, 2010

(65) Prior Publication Data

US 2011/0206343 A1    Aug. 25, 2011

(51) Int. Cl.
    *H04N 9/80*    (2006.01)
(52) U.S. Cl. .......................................... 386/256
(58) Field of Classification Search ................. 386/207, 386/256, 304, 305
    See application file for complete search history.

(56) References Cited

U.S. PATENT DOCUMENTS

| | | | |
|---|---|---|---|
| 4,631,603 A | 12/1986 | Ryan | |
| 4,695,901 A | 9/1987 | Ryan | |
| 4,907,093 A * | 3/1990 | Ryan | 386/245 |
| 5,194,965 A | 3/1993 | Quan et al. | |
| 5,251,041 A | 10/1993 | Young et al. | |
| 5,315,448 A | 5/1994 | Ryan | |
| 5,394,470 A | 2/1995 | Buynak et al. | |
| 5,479,268 A | 12/1995 | Young et al. | |
| 5,579,120 A | 11/1996 | Oguro | |
| 5,583,936 A | 12/1996 | Wonfor et al. | |
| 5,625,691 A | 4/1997 | Quan | |
| 5,633,927 A | 5/1997 | Ryan et al. | |
| 5,651,065 A | 7/1997 | Stufflet et al. | |
| 5,661,801 A | 8/1997 | Sperber | |
| 5,748,733 A | 5/1998 | Quan | |
| 5,907,656 A | 5/1999 | Oguro | |
| 5,953,417 A | 9/1999 | Quan | |
| 6,002,830 A | 12/1999 | Quan | |
| 6,028,941 A | 2/2000 | Kemplin | |
| 6,058,191 A | 5/2000 | Quan | |
| 6,173,109 B1 | 1/2001 | Quan | |
| 6,285,765 B1 | 9/2001 | Quan | |
| 6,381,747 B1 | 4/2002 | Wonfor et al. | |
| 6,421,497 B1 | 7/2002 | Quan | |
| 6,501,842 B2 | 12/2002 | Quan | |
| 6,516,132 B1 | 2/2003 | Wrobleski et al. | |
| 6,690,880 B1 | 2/2004 | Rinaldi | |
| 6,836,549 B1 | 12/2004 | Quan et al. | |
| 6,839,433 B1 * | 1/2005 | Quan | 380/206 |
| 6,931,547 B2 | 8/2005 | Quan | |
| 7,039,294 B2 | 5/2006 | Quan | |
| 7,050,698 B1 | 5/2006 | Quan | |
| 7,085,380 B2 | 8/2006 | Quan | |

(Continued)

FOREIGN PATENT DOCUMENTS

KR    2002-0078344 A    10/2002

*Primary Examiner* — Thai Tran
*Assistant Examiner* — William Tran
(74) *Attorney, Agent, or Firm* — George B. Almeida

(57) ABSTRACT

An integrated circuit or system receives a bit pattern from a metadata, IPG, and or EPG signal. This bit pattern is then coupled to a circuit to provide a content control command to a recorder or to a processing circuit to generate a content control signal. In particular the bit pattern may be utilized in a manner to program, enable, or disable the generated control signal. Furthermore this content control signal provides resistance to a circumvention device. For example, the circumvention device is unable to remove sufficiently the content control signal, and content control is maintained.

21 Claims, 18 Drawing Sheets

U.S. PATENT DOCUMENTS

| | | |
|---|---|---|
| 7,100,209 B2 | 8/2006 | Quan |
| 7,352,863 B2 | 4/2008 | Quan |
| 7,352,864 B2 | 4/2008 | Kaise |
| 7,395,545 B2 | 7/2008 | Wonfor et al. |
| 7,492,896 B2 | 2/2009 | Quan |
| RE40,689 E | 3/2009 | Quan et al. |
| 7,603,025 B2 | 10/2009 | Rinaldi |
| 7,620,178 B2 | 11/2009 | Wonfor et al. |
| 7,706,533 B2 | 4/2010 | Quan |
| 8,019,201 B2 | 9/2011 | Tan et al. |
| 8,094,818 B2 | 1/2012 | Quan |
| 2003/0149980 A1 | 8/2003 | Hassell et al. |
| 2004/0174798 A1 | 9/2004 | Riguidel et al. |
| 2005/0117749 A1 | 6/2005 | Quan |
| 2006/0056809 A1 | 3/2006 | Quan |
| 2006/0083373 A1 | 4/2006 | Ryan et al. |
| 2006/0085863 A1 | 4/2006 | Ryan et al. |
| 2006/0251252 A1 | 11/2006 | Quan |
| 2007/0206794 A1 | 9/2007 | Wonfor et al. |
| 2008/0025696 A1 | 1/2008 | Wonfor et al. |
| 2008/0100597 A1 | 5/2008 | Quan |
| 2008/0178235 A1* | 7/2008 | Wonfor et al. ............... 725/104 |
| 2009/0052866 A1 | 2/2009 | Quan |
| 2009/0297125 A1 | 12/2009 | Wijnen et al. |
| 2009/0327717 A1* | 12/2009 | Jin et al. .................... 713/168 |
| 2010/0021133 A1 | 1/2010 | Wonfor et al. |
| 2010/0054469 A1 | 3/2010 | Quan |
| 2010/0054700 A1 | 3/2010 | Quan |
| 2010/0107201 A1* | 4/2010 | Hannum et al. ............... 725/99 |
| 2011/0135277 A1 | 6/2011 | Quan |
| 2011/0225603 A1* | 9/2011 | Amento et al. ............... 725/12 |

* cited by examiner

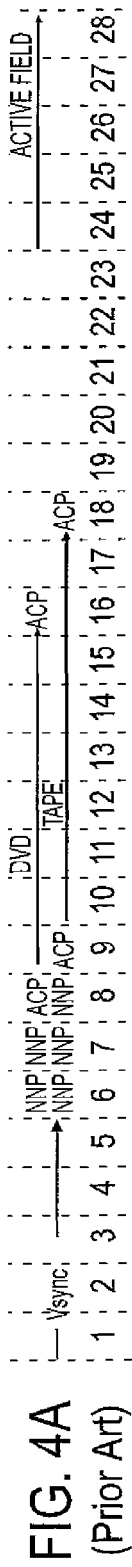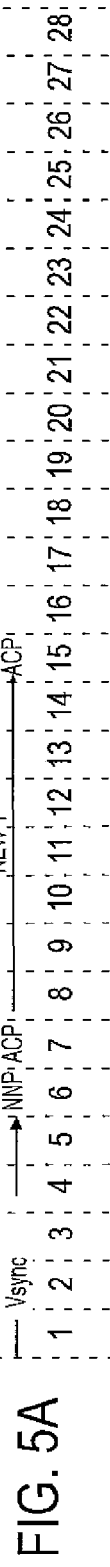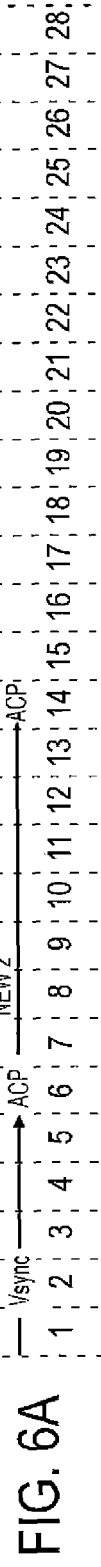

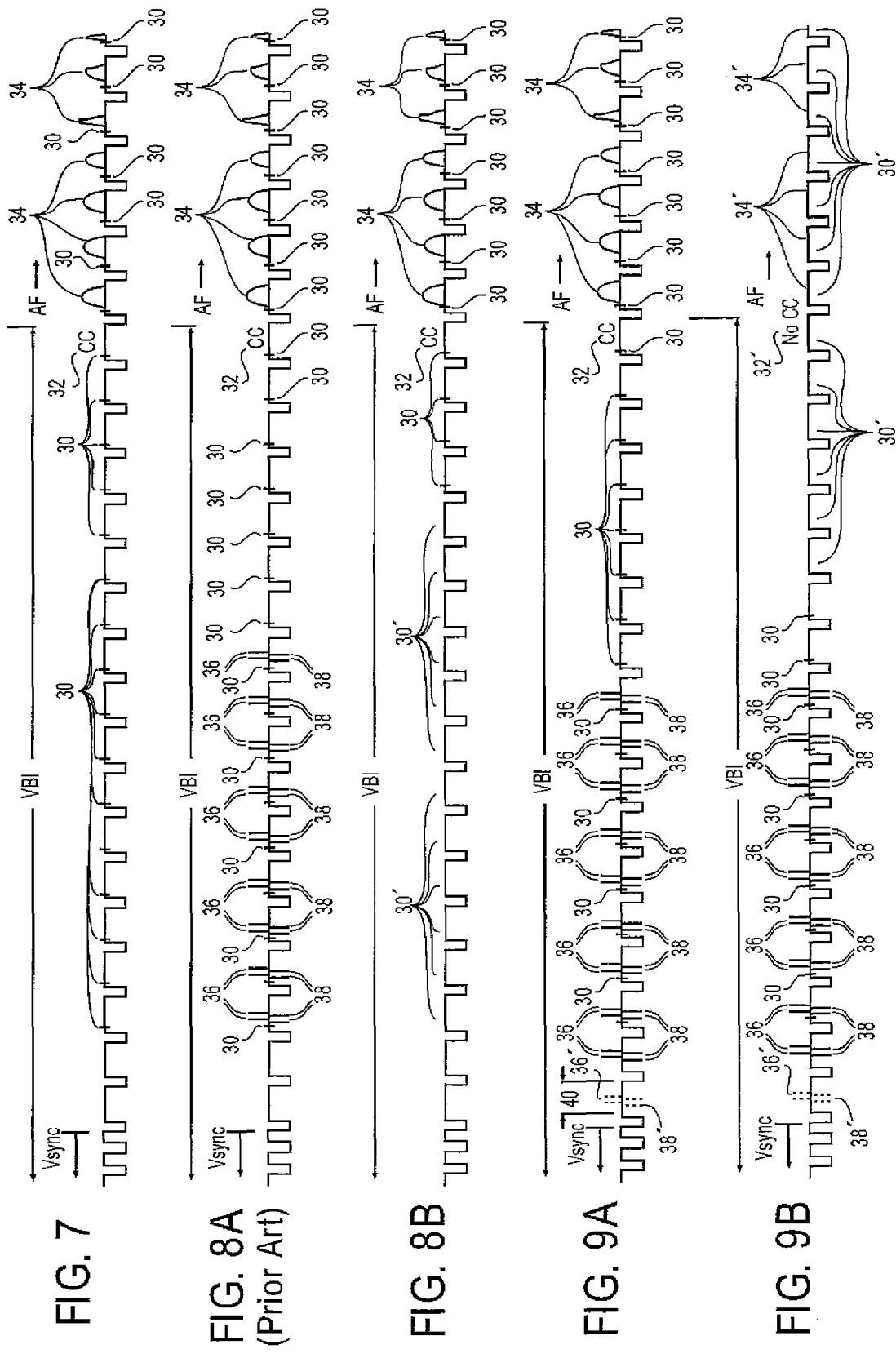

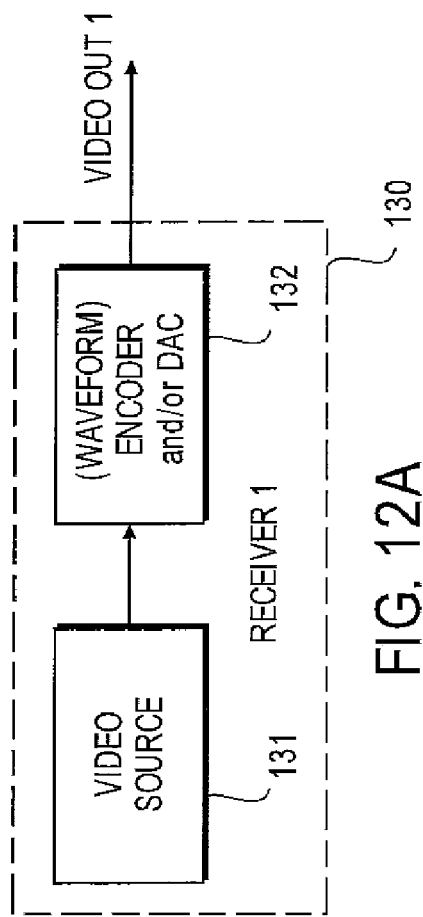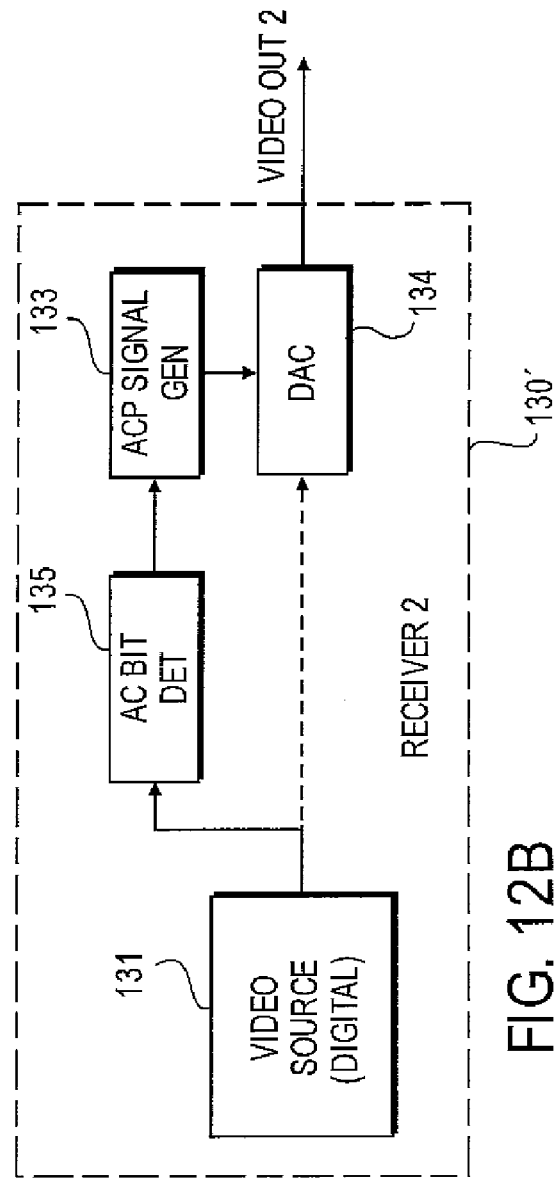
FIG. 12A
FIG. 12B

METHOD AND APPARATUS FOR RECEIVING METADATA, EPG, OR IPG SIGNALS IN AN INTEGRATED CIRCUIT FOR CONTROL PURPOSES

CROSS-REFERENCE TO RELATED APPLICATIONS

The present invention is related to U.S. patent application Ser. No. 12/322,004 titled "Method And Apparatus For Synthesizing Copy Protection For Reducing/Defeating the Effectiveness or Capability of a Circumvention Device," filed on Jan. 28, 2009, U.S. patent application Ser. No. 12/583,834 titled "Method and Apparatus for Providing in a Media Player a Copy Protection Signal that Negates a Circumvention Device and or Provides Improved Playability," filed on Aug. 26, 2009, and U.S. Provisional Patent Application Ser. No. 61/190,254 titled "Method and Apparatus for Synthesizing Copy Protection for Reducing/Defeating the Effectiveness or Capability of a Circumvention Device filed on Aug. 27, 2008, which are all incorporated by reference.

BACKGROUND

The present invention relates to integrated circuits (ICs) or integrated circuits used in receiving devices, which process signals from metadata, an Electronic Programming Guide (EPG), or an Interactive Programming Guide (IPG) for enabling/disabling/programming content control signals. More particularly, the invention relates to an integrated circuit in receiving devices, which include set top boxes, IPTV devices, cell phones, digital media extending devices, which receive video programs via a digital signal.

However, such content control signals have been circumvented by circumvention devices, commonly referred to as "black box" devices, which remove or attenuate the effects of positive and or negative pulses, while passing the (active field) program video intact. Such "black boxes" generally replace the negative (e.g., pseudo sync) and or positive going pulses (e.g. AGC pulses/signals) with a blanking level or with newly regenerated sync pulses free of pseudo sync/AGC signals.

A process disclosed in U.S. Pat. No. 4,631,603, John O. Ryan, December 1986, assigned to Macrovision Corporation, Santa Clara, Calif., incorporated by reference, is well known to have placed pseudo sync and AGC pulses in specific television (TV) lines for pre-recorded video home systems (VHS) tape and digital video disc (DVD) playback devices. These pseudo sync/AGC pulses inserted in a program video signal prohibit recording by affecting the AGC system of a recorder, while allowing (substantially) normal display of the program video signal. These added pulses, pseudo sync and or AGC pulses, have also been used for content control signals for personal video recorders, PVRs, or compliant devices that sense the added pulses and provides a command. However, the makers of the circumvention devices have observed the locations of the added pulses in the vertical blanking interval (VBI), and accordingly have generated a timing pulse to blank out or to modify at least some of the copy protection signals.

Several of the newer circumvention devices do away with conventional timing circuits and rely on microprocessors to provide the blanking pulses. Other circumvention devices utilize traditional timing circuits (e.g., retriggerable one shot) to locate the copy protection pulses.

Also, in the field adding pseudo sync pulses, these signals are usually hidden in a portion of the vertical blanking interval, which generally cause a small scanning error in the display device. But because most displays overscan the video information, which results in a cropped picture, the scanning error is generally not noticeable. However, with some displays with less overscan, a small but perceivable geometric distortion may be observed when certain anti-copy protection signals are applied in the vertical blanking interval.

SUMMARY

An integrated circuit or system receives a bit pattern from metadata, an IPG, and or an EPG signal. This bit pattern is then coupled to a circuit to provide a content control command to a recorder or to a processing circuit to generate a content control signal. In particular the bit pattern may be utilized in a manner to program, enable, or disable the generated control signal. Furthermore this content control signal provides resistance to a circumvention device. For example, the circumvention device is unable to remove sufficiently the content control signal, and content control is maintained.

One embodiment of the invention provides an integrated circuit (IC) that may be used in a receiver, which may include a set top box, computer, cell phone, IPTV device (Internet Protocol), or the like, to output a "new" content control signal (which is normally playable on a TV set) that includes one or more signals that provides resistance to certain circumvention devices. The new content control signal may be used to affect contrast and or brightness in some recorders (e.g., the new content control signal may include at least a copy protection signal resistance to a circumvention device and or other copy protection signals such as added pulses, shifted portion of a video signal, burst phase modification, and or sync pulse modification in amplitude, position, and or width). Generally, an output of the integrated circuit is coupled to an input of the circumvention device. Providing "resistance" to a circumvention device may include causing the circumvention device to pass at its output sufficient added pulses to enable content protection (e.g., effect) on a recorder, and or cause the circumvention device to add enhancement to the content control effectiveness (e.g., the "new" content control signal causes the circumvention device to blank a portion of the active field of the program video source.) The new content control signal provides or outputs a protection signal. The new content control signal may be known as Type RP content control signal or Type RP (protection) signal or RP (protection) signal. "R" for being resistant to circumvention devices or "P" providing improved playability.

One typical example of the present invention includes an IC in a receiver (with a digital and or analog signal coupled to an input of the receiver) that outputs the RP protection signal, along with a video program signal, which is then coupled to an input of a circumvention device. The output of the circumvention device is coupled to a TV set or to a recorder and display. In this embodiment of the invention, the signal from the receiver's output causes the circumvention device to blank out a portion of the (program) video signal. Thus the circumvention device is thereby causing playability problems when the output of the circumvention device is coupled to a TV set. When the output of the circumvention device is coupled to an input of a VCR, the VCR produces a low output video signal (or produces distorted picture) at the VCR output, as when an illegal recording is played back from the VCR. Moreover, when the output of the circumvention device is coupled to a compliant recorder or content control system, record control or content control is not circumvented by the black box, but instead recording is disabled (e.g., in a PVR) or the content control system is enabled.

In some circumvention devices it was found experimentally that the black boxes of previous mention can be disabled by observing the behavior of the microprocessors or certain traditional timing circuits in the black boxes, while still providing an effective protection signal at the output of the device. To reiterate, an (RP) protection signal or (RP) video content protected signal is playable on a TV display, while prohibiting recording, such as by causing an erroneous signal level by affecting an AGC system in a recorder, which causes picture darkening, changes in contrast and or brightness levels (or stops recording on a PVR). Unlike a scrambled video signal, which is not playable on a TV display, the protected video signal is displayed normally (e.g., with few or negligible or zero artifacts). In general, added pulses inserted within two lines after the last post equalizing pulse is provided to produce/provide a protected video signal that is resistant to a circumvention device.

Thus, an intention of an integrated circuit (IC), SOC (System on a Chip), or chip set, in combination with copy protection signals of description herein, is to neutralize or reduce the effectiveness of circumvention devices, while maintaining and or enhancing a (content control) protection effect, thereby providing a novel expansion for media players or DVD players. Accordingly, it is desirable to provide, generate, or synthesize an RP video protection signal which, in combination with integrated circuits, in effect thwarts one or more intended functions of a circumvention device. For example, when a black box is used to circumvent protection signals output from an integrated circuit, an output signal of the integrated circuit is coupled to the input of the circumvention device. (Note: Normally the circumvention device removes prior art content control or copy protection signals, but does not remove sufficiently the Type RP protection or content control signal.) The output of the circumvention device is then coupled to a recorder or compliant device or TV set. When the integrated circuit includes a protection signal (e.g., Type RP) that provides resistance to the circumvention device in accordance with the invention, the circumvention device will then (instead) allow passage of sufficient added pulses or signals (e.g., pseudo sync, AGC pulses, and or color stripe signals) for a content control device to still work properly (e.g., prohibit, limit, or restrict recording on a PVR) or for a VCR's AGC system to react in a manner to provide a degraded signal. That is, in response to the copy protection signal that provides resistance to the circumvention device, the circumvention device "unwittingly" increases/enhances the protection effect by blanking/distorting a portion of the active field (e.g., color burst and or program video near the top of the viewable frame/field).

Accordingly, one effect is to cause a circumvention device to allow the passage therethrough of a number of added pulses or signals such that a VCR still reacts to the copy protection signals following the circumvention device. Another effect is to provide a protection signal such that when it is supplied to a circumvention device, the output of the circumvention device, contrary to its intended function, still provides a detectable content control or content protection signal to a compliant video recorder or compliant device.

Yet another effect is to synthesize a protection signal (e.g., Type RP) such that when coupled to a circumvention device, the output of the circumvention device causes playability problems in a display, or increased protection effect(s) such as blanking out a portion of the viewable area and or causing chroma artifacts.

The above mentioned effects can be implemented in a number of ways such as by moving, adding, or shifting anti-copy protection signals toward the vertical sync signal (e.g., in a 525 or 625 line TV standard, interlaced and or non-interlaced) so as to provide the (Type RP) protection signal. Alternatively, the effects can be implemented by synthesizing an RP protection signal such that there is no more than one video line free of negative going pulse(s) between one horizontal blanking interval to a next horizontal blanking interval (e.g., one or more pseudo sync pulse is provided between lines).

An embodiment of an integrated circuit and the (Type RP) protection signal, in combination in accordance with the invention, improves playability in terms of reducing hooking (or reducing snaking or oscillating in scanning) that can be viewable in some monitors on the top portion of their displays (or a monitor/display with an underscan mode, or with H and or V delay mode). In particular, an embodiment of the invention includes a copy protection process comprised of Format A and Format B, wherein the formats are interleaved from one TV line to another. Because the formats have in general different positions of pseudo sync pulses or different numbers or pseudo sync pulses for each format, a TV scanning system's phase lock loop system can be excited into causing errors in scanning. By shifting the pseudo sync pulses of the Format A and Format B copy protection signals closer to the vertical sync signal area or away from the active field, the phase lock loop system is allowed to settle in such a way that playability is improved or that a scanning error is reduced. Alternatively, the playability is improved when Format A equals Format B, when the copy protection signals are shifted away from the active field, or when the copy protection signals are moved closer to the vertical sync signal in the vertical blanking interval (VBI).

Another embodiment of the invention provides a protection signal (e.g., Type RP signal) of improved playability, wherein the protection signal includes pseudo sync signals and provides in TV lines the pseudo sync signals located away from the active video field or closer to the vertical sync signal, wherein the (newly located; or provided, such as a fewer number of negative going pulses near the active field, or few negative pulses in a portion of the vertical blanking interval) pseudo sync signals provide less scanning errors or geometric distortion on a TV set. As described above, the pseudo sync signals may have (same or) different number of pseudo sync pulses from one TV line to another or (same or) different pseudo sync pulse width from one TV line to another line.

A further embodiment includes providing improved playability of a (Type RP) protection signal, wherein the copy protection signal includes pseudo sync pulses (or pulse pair signals of pseudo sync and AGC signals) of a different number of pseudo sync pulses (or pseudo sync and AGC signals) from one TV line to another line and or different pseudo sync (or pseudo sync and AGC) pulse widths from one TV line to another. This embodiment includes modifying or providing at least one TV line to provide at least two lines consecutively with substantially the same number of pseudo sync pulses and or substantially the same pseudo sync pulse width. It should be noted that the resulting copy protection signal may still include an alternating pattern or format of a number of pseudo sync pulses and or pseudo sync pulse widths from one line to another.

By way of example, an embodiment of the invention may have (in a 625 line standard such as, for example, PAL or Secam) a Format A, which has 7 (or 6 or at least 1) pseudo sync or AGC pulses on video line 7 (or 6), followed by Format B, which has 6 (or 7 or at least 1) pseudo sync or AGC pulses on video line 8 (or 7). This example of the embodiment provides resistance to the intended function of a circumvention device by, for example, causing the black box to blank color burst in a portion of the active field, causing the circumvention device (black box) to remove or modify program video in an active portion of the TV field, and or causing the circumvention device to allow the passage of at least some or all of (Type RP) protection signals in a TV field. This embodiment also may provide improved playability of the program video signal.

Similarly, in a 525 line standard (e.g., NTSC or PAL-M), another embodiment of the invention provides one or more (e.g., 4) pseudo sync pulses or pseudo sync and AGC pulses (e.g., starting) at line(s) 10, 11, 272, and or 273. In this embodiment of a 525 line standard, resistance to a circumvention device is provided, for example, by causing the circumvention device to pass some or all of the (Type RP) protection signals to provide a copy protection or content control effect, whereas the circumvention device's intended function is to remove the copy protection signal to defeat a copy protection or content control effect. In an embodiment of the invention, an existing 525 line protection process may already have a line with pseudo sync pulses after a post equalizing pulse or vertical sync signal in one field, thereby causing a circumvention device to pass the copy protection process in one field while blanking out protection signals in another field, which provides a partial (e.g., about half) resistance to the circumvention device. The integrated circuit of the invention may program or provide placing pseudo sync pulses after both fields after a post equalizing pulse or vertical sync signal (e.g., provide pseudo sync pulses in lines 10 and 272, or line 10 in field 1 and line 9 in field 2) to provide for more resistance (e.g., more than half, such as full) to the circumvention device.

In another example of the embodiment, an existing copy protection process may have partial resistance to a circumvention device by providing pseudo sync pulses on line 10 of field 1 but no resistance to the black box by placing pseudo syncs in line 10 of field 2 (line 273=line 10 of field 2). Further, an embodiment of the invention places one or more pseudo sync pulse on line 9 of field 2 (line 272), while on field 1, one or more pseudo sync pulse may be placed on line 10 and or 11. An embodiment of the invention may program the integrated circuit (receiver) to provide partial resistance to a circumvention device, such as providing resistance on an even field (e.g., in field 2, provide a pseudo sync on line 9 or 272), while not providing resistance on an odd field (e.g., in field 1, provide a pseudo sync on line 11 or after), or vice versa.

The 525 or 625 line standard embodiments of previous example provide improved playability for a signal of the (Type RP) protection process (or for a content control signal), for example, in terms of reduced geometric distortion in a display.

Generally, in an integrated circuit (receiver) including a chip set or SOC, the transmission signal or signal into the IC (receiver) may include a bit pattern, and or control bit(s), such as APS bit(s), trigger bits, or one or more flag signals. The control bits command/provide/program (e.g., to enable, disable, provide, modify, and or program) or select a particular version of the (Type RP) protection signals of previous description herein (or content control or protection signals described hereafter), to provide resistance to circumvention devices or provide improved playability, in accordance with the invention. It should be noted that a bit pattern or control bit(s) may be provided by way of metadata, EPG, IPG, and or watermarked signals. For example, metadata that normally provides information on program material (e.g., movies, TV programs, audio and or video files, or the like) can be used to command/provide/program any protection or content control signals described in this application. A watermark video or audio signal may also convey information for providing a bit pattern or control bit(s) as previously described. Here for example, a watermarked signal in a video signal's image area or a watermarked signal embedded in an audio program signal can provide one or more bits to command/provide/program for any content control or (Type RP) protection signal of description in this invention.

In accordance with the invention, an integrated circuit (e.g., receiving device with the IC) including a tuner, may alternatively command or select one of such protection signals via control bit(s) or bit(s) from a transmission link, authorization code, remote control, hardware (e.g., jumper or switch), software, or other methods different from receiving a bit from the recorded or stored medium. Further, such a (Type RP) protection signal may be activated or deactivated in the integrated circuit, or in the circuit board, IC and or chip within a receiving device.

Accordingly, the invention pertains to integrated circuits as used in receivers that provide one or more of the (Type RP) protection signals and or video signal modifications of description herein, which receiver or integrated circuit includes a link to a digital network, Internet, cable, telephone (network), wireless router/server/connection or the like, and may include further storage via optical, solid state, or magnetic methods for playing back recorded video/audio programs.

BRIEF DESCRIPTION OF THE DRAWINGS

FIG. 4A illustrates the line locations of two prior art content protection processes within a portion of the vertical blanking interval (VBI) and active field.

FIG. 4B is a waveform illustrating an output of a first timing circuit of a sync separator and timing circuit.

FIG. 4C is a waveform illustrating a blanking or removing pulse triggered by the trailing edge of the waveform in FIG. 4B.

FIG. 5A illustrates the line locations of copy protection signals for an embodiment (e.g., NEW1).

FIG. 5B is a waveform illustrating a blanking or removing pulse derived from timing circuits 22 or 22" of FIG. 3A or 3C, respectively.

FIG. 5C is a waveform illustrating a blanking or removing pulse derived from circuit 22' of FIG. 3B.

FIG. 6A illustrates the line locations of alternative protection signals for another embodiment (e.g., NEW2).

FIG. 6B is a waveform illustrating a blanking or removing pulse derived from circuit 22 of FIG. 3A.

FIG. 6C is a waveform illustrating a blanking or removing pulse 12^ or 12* derived from circuits 22' or 22" of FIG. 3B or 3C, respectively.

FIG. 7 is a waveform illustrating a video signal prior to inserting or adding a protection signal.

FIG. 8A is a waveform illustrating a video signal with a prior art protection signal.

FIG. 8B is a waveform illustrating an effect of a circumvention device on the video signal of FIG. 8A.

FIG. 9A is a waveform illustrating a video signal with a (Type RP) protection signal of an embodiment of the invention.

FIG. 9B is a waveform illustrating an effect of a circumvention device on the video signal of FIG. 9A.

FIGS. 12A-12E illustrate examples of a system operator, digital receiving system, and or receiver which, employ the protection signals of description herein.

DETAILED DESCRIPTION

Figure 1A:
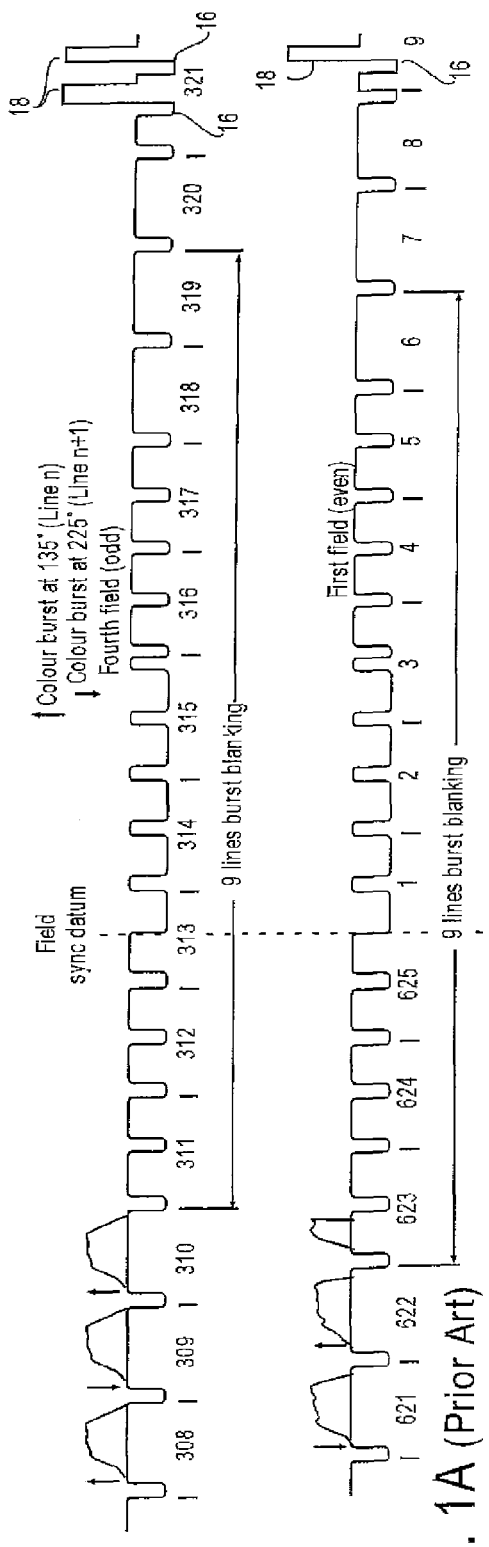
FIGS. 1A and 1B are waveforms illustrating examples of prior art content protection signals.

FIG. 1A illustrates a prior art example of a signal in a video home systems (VHS) tape process for providing protection employing one or more pseudo sync/AGC (automatic gain control) pulse pairs starting in lines 9 and or 321 for a 625 line standard. Circumvention devices remove one or more of the pseudo sync/AGC pulses to allow a recordable copy. Pseudo syncs pulses are illustrated by numeral 16 and AGC pulses are illustrated by numeral 18 in FIGS. 1A, 1B, 2A, and 2B.

Figure 1B:
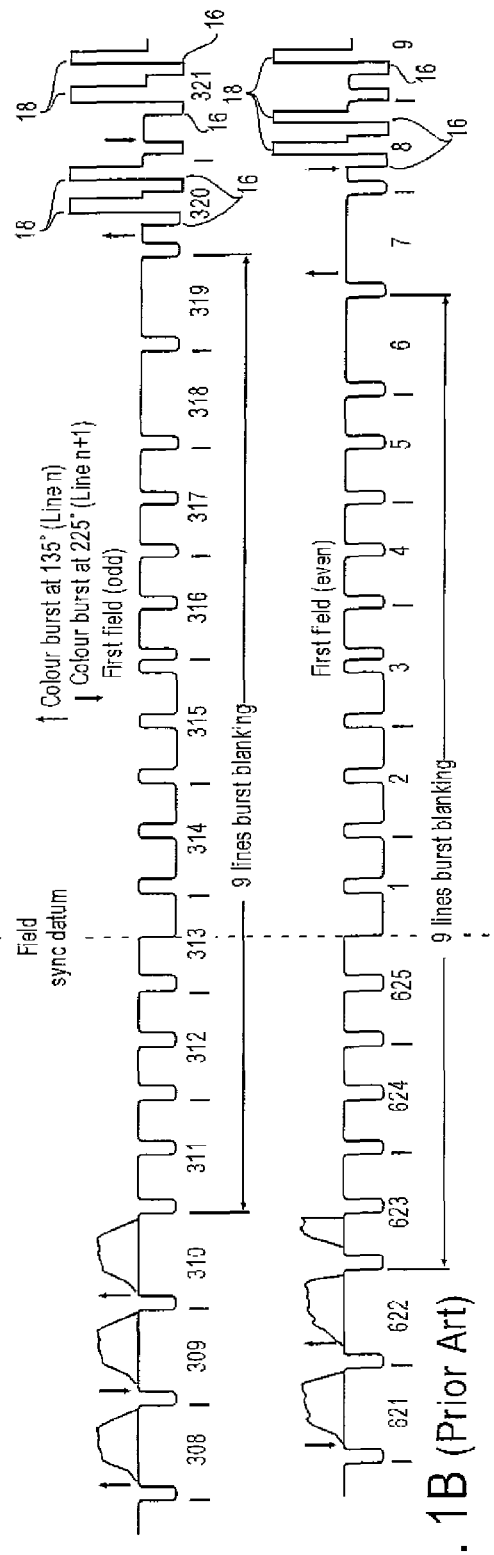

FIG. 1B illustrates a prior art example of a DVD (or tape) process for providing copy protection employing one or more pseudo sync/AGC pulse pairs starting in lines 8 and or 320 for a 625 line standard. Circumvention devices remove one or more of the pseudo sync/AGC pulses to allow a recordable copy.

Figure 1C:
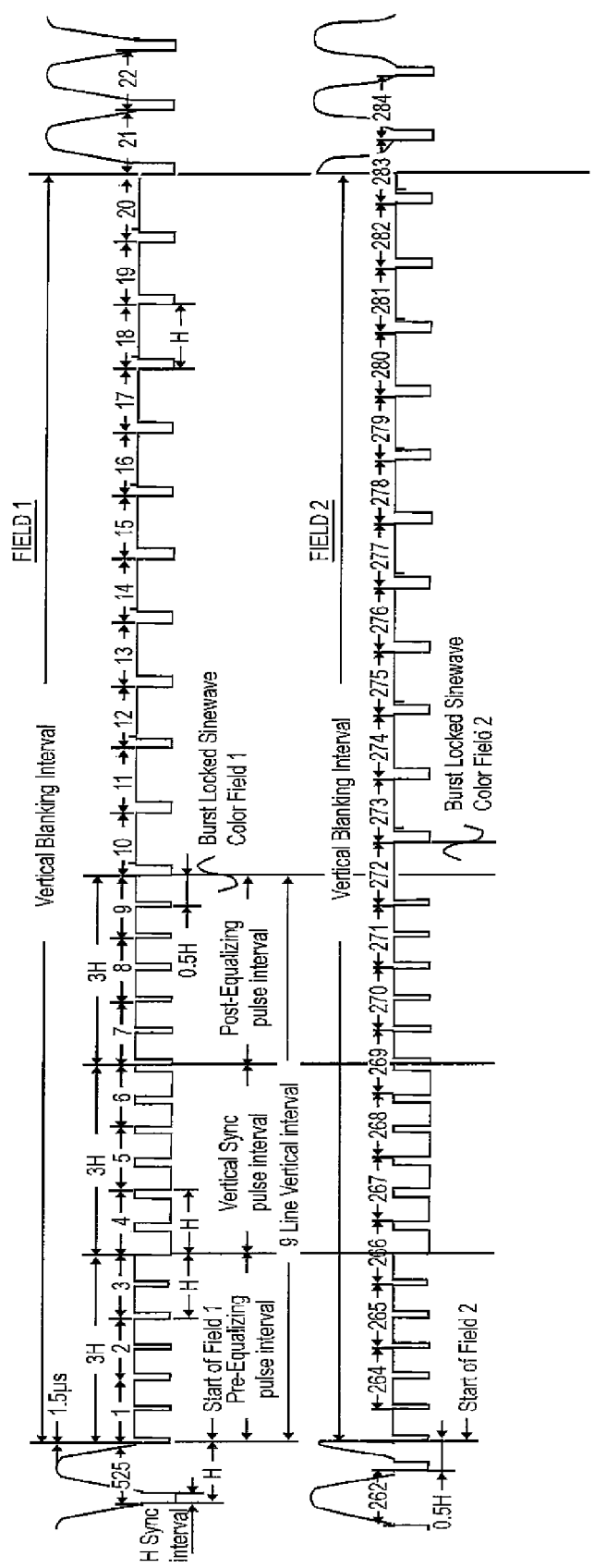
FIG. 1C are waveforms of video line locations for a 525 line TV standard such as NTSC.

FIG. 1C illustrates a prior art example of the standard TV line allocation for a 525 TV line standard, NTSC.

Figure 2A:
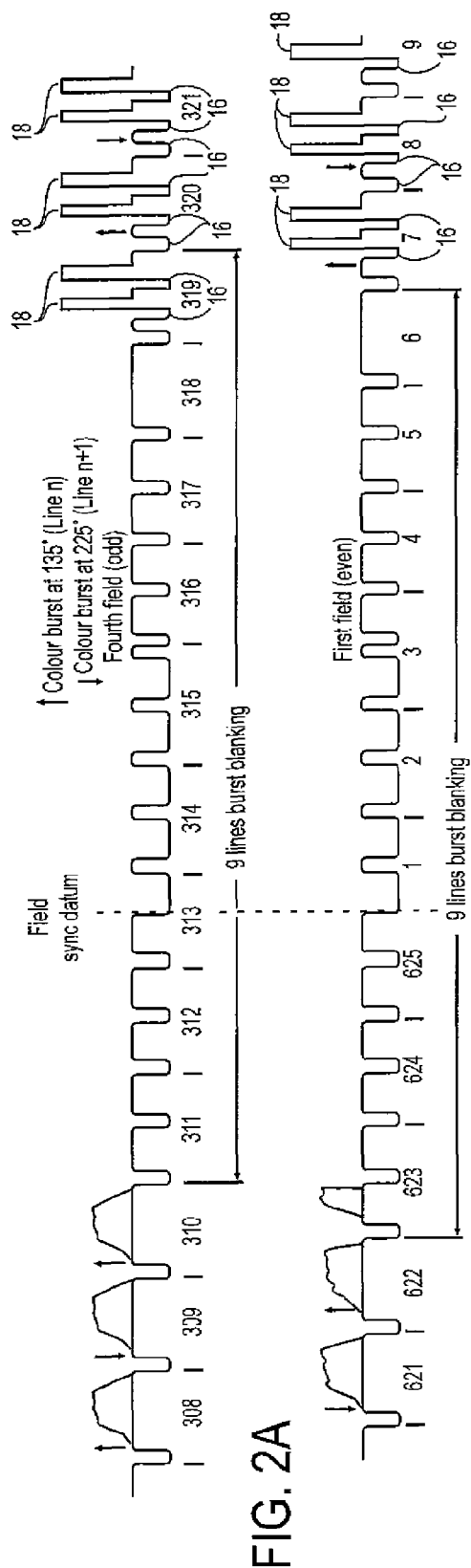
FIGS. 2A and 2B are waveforms illustrating examples of one or more waveforms for combination with integrated circuits of the invention.
Figure 2B:
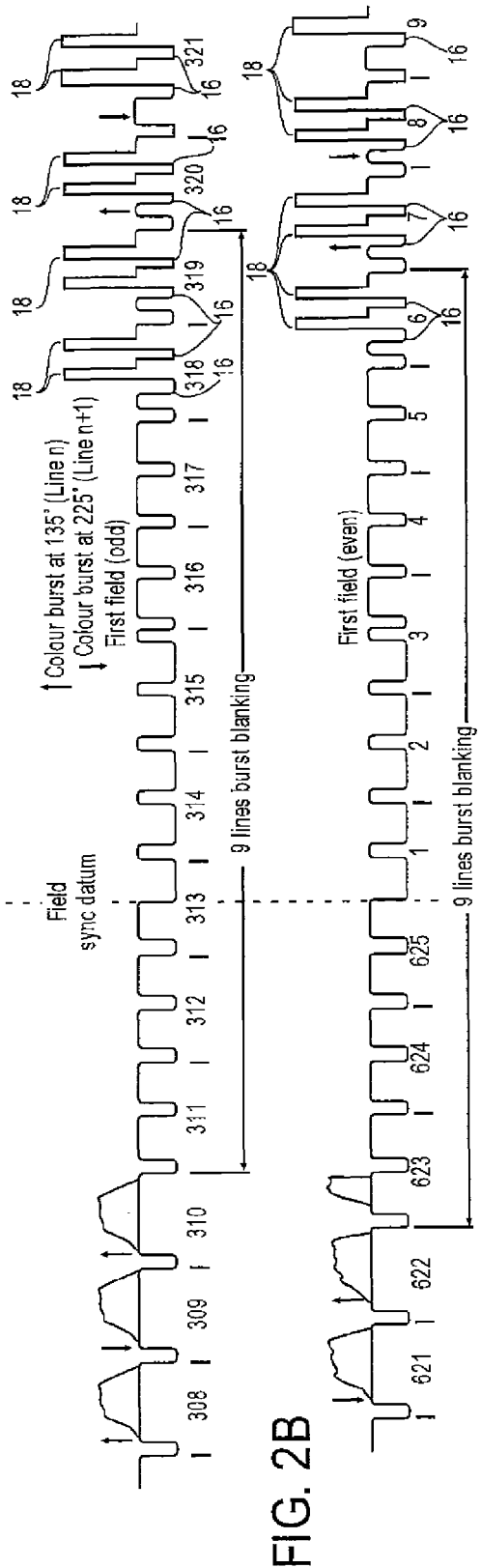

FIG. 2A or 2B illustrates an embodiment wherein one or more pseudo sync pulse (or pseudo sync/AGC pulses) is inserted in lines 7 (or 6) and or 319 (or 318) for a 625 line standard example. This particular example of line assignment for pseudo sync (or pseudo sync/AGC) pulses causes some circumvention devices to experience one or more of the following (failures in intended function):

1) Fail in removing one or more (added) protection pulses, or still allow an effective protection signal or content control signal to be passed to a recorder or compliant device.
2) Fail in providing an improved playable video signal by degrading the video signal via blanking/attenuating/removing a portion of the active field (program) video picture.
3) Fail in providing an improved playable video signal by degrading the video signal via blanking/attenuating/removing at least a portion of color burst in TV lines near or in a portion of the active field (which for example, causes color to unlock at the top of the picture causing color distortion when recorded or played back, or when sent directly to a TV set.).

Figure 3A:
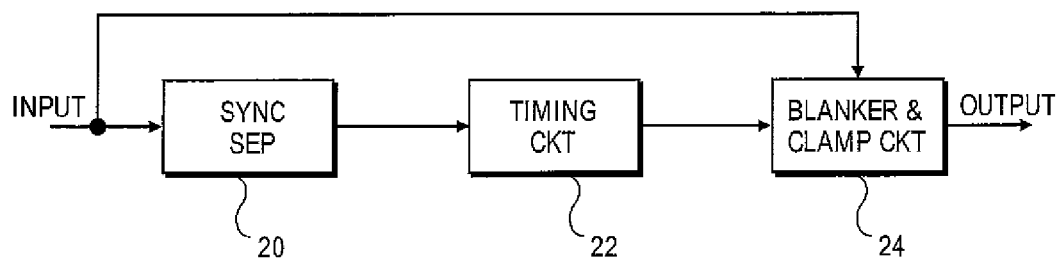
FIG. 3A is a block diagram illustrating a prior art circumvention device ("black box").

FIG. 3A illustrates a prior art circumvention device (black box), which removes (added) protection pulses typically located inside a portion of the vertical blanking interval (VBI). A protected video signal containing typically pseudo sync/AGC pulses as illustrated in FIG. 1A or 1B is coupled to the input of a sync separator circuit 20. The output of sync separator circuit 20 is coupled to a timing circuit, 22, which provides typically a logic signal coincident with line locations of the input's protection signal to a blanker circuit 24. Blanker circuit 24 then removes or replaces the protection signals with another signal such as a blanking level, which therefore removes pseudo sync/AGC pulses while passing substantially the video program from the input. This provides a new signal at the output of the blanker circuit 24, whereby the output of circuit 24 provides a recordable signal.

Figure 3B:
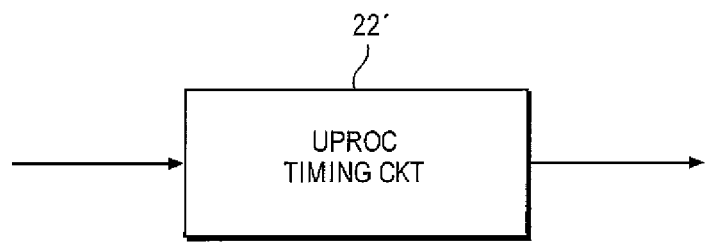
FIG. 3B is a block diagram illustrating a timing circuit including a microprocessor device for a circumvention device.

FIG. 3B shows an example of an alternative timing circuit 22', which uses a microprocessor or computational circuit. Circuit 22' may provide a signal to the blanker circuit 24 of FIG. 3A via an alternative method. For example, circuit 22', as found experimentally, may require at least two lines of video that do not have a second (e.g., extra) negative going pulse during an interval of one horizontal line's duration (e.g., 63.55 usec or 64 usec) after the vertical sync signal. An example of this is illustrated in FIG. 1A where the last vertical sync signal ends on line 5, and (three) lines 6, 7, and 8 are free of negative going pulses within a horizontal line duration (before extra negative pulses such as pseudo sync pulses (16) appear on line 9 and other lines beyond). In a standard TV signal for 625 or 525 lines, the vertical sync signal always includes (extra or second) sync pulses that occur at twice the horizontal frequency. This means that one extra pulse is inserted between a TV line interval for the vertical sync signal, which typically includes equalization sync pulses and (serrated) broad pulses or vertical sync pulses. Circuit 22' senses the one or more extra negative going pulses between a TV line interval (e.g., about 64 microseconds or 63.55 microseconds) to determine the presence of the vertical blanking interval (VBI). After two or more lines which do not include the extra inserted negative going pulse are determined, a blanking pulse is generated.

Similarly in FIG. 1B (two) lines 6 and 7 are free of (extra) negative going pulse(s) within one horizontal line's duration.

Timing circuit 22' (FIG. 3B) searches for at least a two line gap free of (extra) negative going pulse(s) within a horizontal line duration, and provides a blanking pulse for the removal of the (added) protection pulses starting from lines 9 or 8, as illustrated in FIGS. 1A and 1B respectively. Thus, microprocessor timing circuit 22' has no problem in providing a signal for removal of the (added) protection signals, as illustrated in FIG. 1A or 1B. However, for the waveforms in FIG. 2A or 2B, the pseudo syncs occur in lines which the microprocessor timing circuit 22' reads as still part of the vertical sync signal, and thus does not output a signal (e.g., for removal or defeating protection signals) until after the last line of protection signal (e.g., the last line in the VBI that still has pseudo sync pulses such as line 16, 17 or 18 or beyond). Circuit 22' reads the pseudo sync pulses as equalizing pulses or some part of the vertical sync signal, and thus is programmed not to remove any pulses or signals resembling a vertical sync signal. Removing a vertical sync signal is prohibited by the microprocessor since this would cause a loss in vertical sync or cause a TV display to unlock field/frame-wise. Thus, careful line location (or placement) of the pseudo sync pulses for a protected video signal causes microprocessor timing circuit 22' to allow passage of at least some or all of the pseudo sync or pseudo sync and AGC pulses to the circumvention device's output (terminal).

Figure 3C:
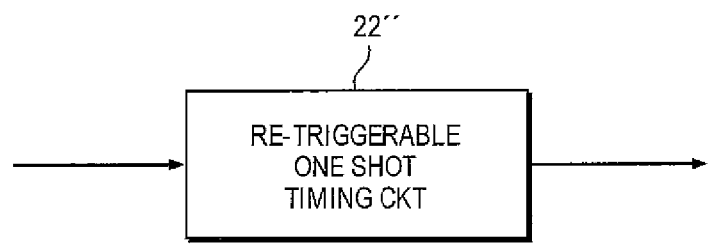
FIG. 3C is a block diagram illustrating a timing circuit including a retriggerable circuit for a circumvention device.

FIG. 3C illustrates another timing circuit, 22", which includes a retriggerable one shot or equivalent. Essentially, circuit 22" is turned to a high logic level without interruption during the presence of a vertical sync signal in the VBI. For example, if timing circuit 22" is set to produce a 45 microsecond pulse, then when a vertical sync signal triggers the circuit 22", a logic signal at the output of circuit 22" is turned high during the vertical sync signal. The output of timing circuit 22" is then high continuously because of the pulses between a TV line's interval, which retriggers and causes a high output due to 2H pulses that are spaced about 31.5 usecs or 32 usecs apart (e.g., pre/post equalizing pulses or serrated (broad) vertical sync pulses) in the vertical sync signal. When one or more pseudo sync pulses is added or provided to TV lines after the post equalizing (2H) pulses of a vertical sync signal, the one or more pseudo sync pulse also has the same effect on a retriggerable timing circuit as the 2H pulses. Thus, placement of pseudo sync pulses right after the vertical sync signal or the post equalizing pulse causes the retriggerable circuit to remain high, continuously from the vertical sync signal, until after the last TV line which includes pseudo sync pulses. A circumvention device (black box) that includes this type of retriggerable timing circuit thus will allow passage of some or all of the (newly placed) pseudo sync or protection signals to the output of the black box.

FIG. 4A illustrates a line location of prior art protection signals such as pseudo sync/AGC signals (ACP) in a 625 line standard format. For example, in video lines 8-16, the prior art ACP signal (e.g., for set top boxes or DVD players) is comprised of pseudo sync and AGC pulses. Similarly, for video tape, the prior art protection process is comprised of ACP signals (e.g., pseudo sync and or AGC pulses) from lines 9-18.

Also shown in FIG. 4A is the video line location from a vertical sync signal (e.g., such as including broad vertical sync pulses, and or post equalizing pulses) as lines 1-5 in a 625 (e.g., PAL or SECAM) TV standard.

FIG. 4A shows the beginning of the active field of the video signal as line 24 and beyond, and video lines 6 and 7 (or line 8 in a tape process) show that they have no extra negative pulse(s) (NNP).

FIG. 4B illustrates that the vertical sync signal is sensed by circumvention devices, and a timing signal is generated to yield/produce/provide a high to low logic signal transition at approximately line 8 of the VBI.

FIG. 4C then shows a pulse which is triggered by the pulse high to low transition of FIG. 4B, wherein the pulse in FIG. 4C is logic high from line 8 to about line 21 (or to at least line 18), which blanks or modifies the ACP signals as seen in FIG. 4A. With the prior art ACP signals of FIG. 4A, any of the timing circuits 22, 22' and 22" is effective in removing the ACP signals depicted in FIG. 4A.

FIG. 5A illustrates an embodiment for providing or synthesizing a new (Type RP) protection signal (e.g., NEW1). Here the copy protection signal, which includes negative going pulse(s) (e.g., one or more pseudo sync pulse) and or positive going pulse(s) (e.g., one or more AGC pulse(s)) that is/are inserted in line 7. Note that in this example, there is one video line (e.g., line 6) free of one or more extra negative going pulse after the vertical sync signal. One embodiment includes a one line gap (e.g., line 6) between a vertical sync signal and a protection signal including negative going pulse(s).

FIG. 5B illustrates that protection pulses are mostly removed by a timing circuit 22 or 22", which allows the recording of a copy. To the contrary, FIG. 5O shows that the (added pulse) protection signals are not removed by timing circuit 22' (e.g., microprocessor timing circuit). Instead, at least a line (e.g., lines 24 to 27) of the active field is/are removed or blanked out. The reason for the erroneous operation of the circumvention device is because the microprocessor circuit 22' is expecting at least two lines free of (negative going, equalizing, and or pseudo sync) pulses between two horizontal intervals. In FIG. 5A, the new (Type RP) protection signal has only one line free of negative pulses between two horizontal (e.g., blanking) intervals. Recall that the post equalizing sync pulses and pseudo sync pulse(s) are (extra) negative going pulses between two horizontal blanking (or line) intervals.

FIG. 6A illustrates another embodiment (e.g., NEW2) where the negative going pulses are added to a line adjacent to the vertical sync signal (e.g., line location of post equalizing pulse(s)). For example, in the PAL standard or 625 TV line standard, the end of the vertical sync signal may be the last post equalizing sync pulse on lines 5 and/or 317. So an embodiment of the invention may include adding pulses (e.g., negative going pulses, pseudo sync pulses or pulse pair signals) on lines 6, 7, 318, and or 319. Similarly, in a 525 TV line standard (FIG. 1C), pulses may be added, as described above, on lines 10, 11, 272, and or 273.

In another example, such as in a PAL standard, as long as there is no more than one video line after the vertical sync signal that is free of (extra) negative going (e.g., pseudo sync, or an extra sync) pulse(s), certain circumvention devices are defeated by the (Type RP content) protection signal. Thus, an embodiment includes a number of lines containing negative going pulse(s) immediately after, or one line delayed from, a post equalizing vertical sync pulse (or a vertical sync signal). This number of lines may be consecutive in terms of containing negative going pulses, such as pseudo sync pulses, or may have one line in a set or series of TV lines that does not have the (e.g., extra) negative going pulses.

In one embodiment, typically 6-14 lines in the VBI (and or its vicinity) including 2-8 pseudo sync pulses or pulse pair signals (per line), begin at lines 6, 7, 318, and or 319, for a 625 (PAL or SECAM) line standard. Similarly, in a 525 NTSC, or equivalent line locations for NTSC or PAL-M line standard, the pulses begin at lines 10, 11, 272, and or 273.

FIG. 6C illustrates that there is no video line that is free of an extra negative going pulse(s) (e.g., no gap) because post equalizing pulses (e.g., line 5 part of a vertical sync signal) are followed in the next line with other negative going pulse(s) such as for example, pseudo sync pulse(s) on line 6 (in FIG. 6A). Thus, both timing circuits 22' and 22" fail to provide the correct blanking or removal pulse. Instead, the (Type RP) protection pulses of FIG. 6A are not removed or reduced, while blanking or removing occurs in a portion of the active video field. Modification or blanking of a portion of the video signal is denoted by the logic high states of signals 12\* and or 12^. In FIG. 6C, signal 12\* shows how a circumvention device would remove or modify a portion of the signal from line 16 to a portion of the active field, while passing at least an effective number of protection signals residing prior to line 16. Similarly, signal 12^ shows again how a circumvention device would blank, attenuate, or modify a portion of the video signal from video line 17 to a top portion of the active video field, while allowing passage of protection signals prior to line 17.

It should be noted that the circuit 22 of FIG. 3A still effectively removes the new copy protection signal of FIG. 6A.

FIG. 7 illustrates a typical or standard video signal in a portion of the vertical blanking interval (VBI) and active television field. Color burst envelopes, which are used in recorder and or TV sets for proper color decoding or reproduction, are denoted by numeral 30. A Closed Caption (CC) data line or data signal is denoted by numeral 32. Active field (AF) program video (line) is illustrated by numeral 34.

FIG. 8A illustrates a prior art protection signal including AGC pulses 36 and pseudo sync pulses 38.

Just for illustration purposes, the number of pseudo sync and AGC pulses in FIGS. 8A, 9A and 9B, are shown to have 2 pulse pairs per TV line, but any number greater than or equal to 1 pulse pair per line may be implemented in, for example, the FIGS. 8A, 9A, and or 9B.

FIG. 8B illustrates the effect of a circumvention device utilizing, for example, the timing circuit 22' of FIG. 3B. The prior art copy protection signals 38 (pseudo sync) and 36 (AGC) shown in FIG. 8A, are removed, and so are a number of color bursts 30 of FIG. 8A removed in the VBI. The removal of color bursts is depicted in FIG. 8B by numeral 30'.

FIG. 9A illustrates an embodiment of a new or Type RP protection signal where the (added pulse) protection signals start sooner than the prior art protection signals; that is, start in the first or second line after the vertical sync signal. In FIG. 9A there is only a one line gap 40, which is free of added negative pulses (e.g., new protection signal may include pseudo sync and or AGC) or "extra" negative going pulses (38', or 38' and 36') after the vertical sync signal.

FIG. 9B then illustrates the effect(s) of a circumvention device mishandling the new (Type RP) protection signal (e.g., pseudo sync and or AGC pulses) shown in FIG. 9A. Here a microprocessor timing circuit 22' (for example) causes the particular prior art circumvention device to pass one or more or all of the (added pulse) protection signals (e.g., pulses 38 and or 36) to the circumvention device's output, which action is opposite to the intended function thereof, thereby still providing the (black box's) output with an effective (Type RP) protection signal. Furthermore, the output of the prior art circumvention device includes the loss of the color bursts of FIG. 9A, into a top portion of the active field TV lines, which will cause noticeable and viewable color demodulation problems. The removal and thus lack of color bursts is depicted in FIG. 9B by numeral 30'.

Also, because a portion of the active video field is missing or blanked out, the effectiveness of the (content control) protection is enhanced. For example, signal 34' denotes a blanked or altered portion of the active field video program signal 34 of FIG. 9A. For example, one or more or all of the protection signals is/are passed to the output of the circumvention device. But, the circumvention device also provides a blanked portion of viewable video, and/or provides loss of color burst, as depicted by numeral 30'(blanked or modified color burst) in FIG. 9B, in sufficient TV lines to cause errors in color demodulation or decoding in a TV set or recorder. So by providing or synthesizing the new protection signal, certain black boxes actually increase the effectiveness of the enhanced and or new protection signal. Alternatively, the certain circumvention devices cause playability problems on TV monitors as, for example, by blanking or modifying one or more color burst signals (e.g., FIG. 9B, numeral 30').

Also shown in dotted lines in FIG. 9A or 9B, is an alternative new protection process (e.g., Type RP content control signal) where protection signals 36', 38' are added in the first video line interval after V sync, whereby there is no TV line free of protection signal(s) or negative going pulses after a vertical sync signal. This alternative embodiment works similarly in that one or more or all (added pulse or Type RP) protection signals are passed to the output of the circumvention device (e.g., circumvention devices that utilize for example, a microprocessor timing circuit 22' (FIG. 3B) or a retriggerable timing circuit 22" (FIG. 3C). The circumvention device further enhances the new protection process by blanking out a portion of an active field (as depicted by numeral 34', FIG. 9B), and or causes improper locking of color reproduction on a TV monitor or recorder as, for example, by blanking or modifying one or more color burst signals (as depicted by numeral 30'). It should be noted for clarity in the illustrations for FIGS. 8A, 9A, and or 9B, one or more color burst envelope is not necessarily labeled as 30 on every line.

Figure 10:
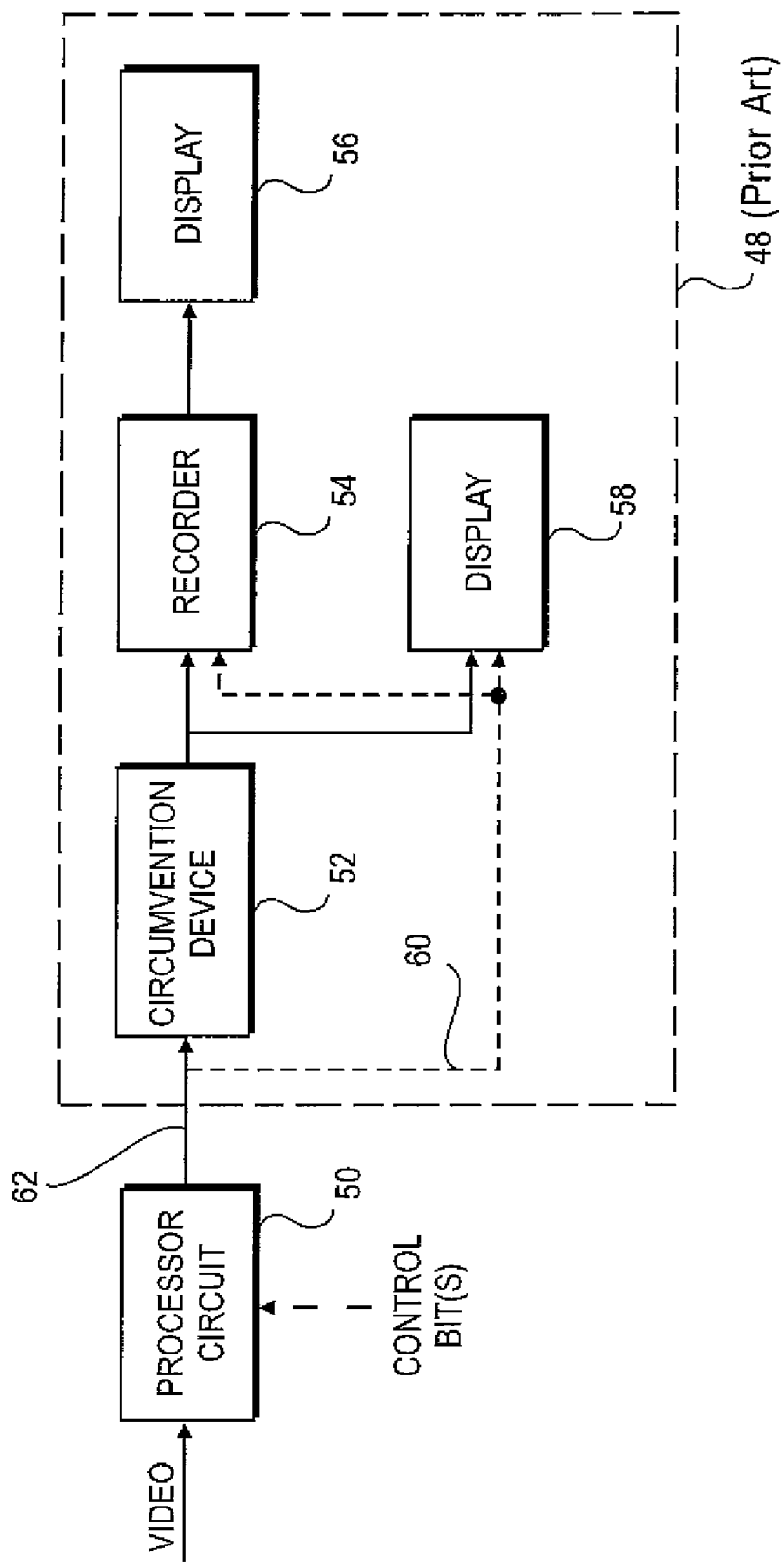
FIG. 10 is a block diagram illustrating an embodiment comprising a processor, which is coupled to a circumvention device and other equipment.

FIG. 10 illustrates an example of an embodiment including a processor circuit 50. Circuit 50 may be part of an integrated circuit, which receives video in analog and or digital form. Circuit 50 outputs a video signal that provides a (content) protection effect and reduces the effectiveness of a circumvention device. To this end, the apparatus may include control bit(s) to configure (any of the) various versions of the waveforms (e.g. FIGS. 2A, 2B, 5A, 6A, and or 9A) and or to enable or to disable any version of the protection signal at the output of processor circuit 50. For example, digital video may be coupled to an input of processor circuit 50, which may include one or more waveform circuits (e.g., fixed or programmable) to synthesize one or more negative going pulse, or one or more pulse pair signal including sync/pseudo sync and AGC pulse. The negative going pulse(s) are included immediately following, or in the next line after, a vertical sync signal, or a first/second line after a vertical sync signal that is typically outside a sync interval or location. Circuit 50 may include an encoder and or digital to analog converter to provide a signal of one or more TV standards. The signal may include a (Type RP) content protection signal that is resistant to black boxes, a copy protection signal that causes a black box to further discourage copying and or to cause the black box in conjunction with the (Type RP) protection signal to provide a synergistic protection effect.

A synergistic effect may include passing one or more (added pulse) protection signals or pulses to the output of the circumvention device, which causes darkening or other protection effects on a recording, while causing the circumvention device to implement one or more of the following artifacts:

1) A clamp error in a portion of the program video signal, which causes level shifting, typically undesirable, in a part of the video signal.
2) A loss of color burst in one or more active TV lines.
3) A loss of program video information in one or more active TV line, which can include darkening or a blanking near or at the top of the display (or from a recorder).
4) Color unlocking or color distortion (e.g., errors in hue and or saturation) in one or more active TV lines, which can lead to incorrect color displayed on one or more lines near or at the top of the display, or loss of color for one or more lines near the top of the display. Recorders may also exhibit extra color unlocking (or color distortion) upon record and or playback.
5) New or increased playability artifact(s) when coupled to a TV display, which can include both (or either) color and extra darkening (or blanking and or attenuating) effects on a TV display and or a recorder.

Processor circuit 50 may include control bits or one or more bit patterns to enable, configure, and or disable at least a portion of the (content or Type RP) protection signal.

Also illustrated in FIG. 10 is an exemplary prior art circumvention device ("black box") 52 (e.g., a circumvention device with a timing circuit 22' or 22"), a recorder 54 coupled to the prior art circumvention device 52, and a first display 56 that is coupled to the recorder. Also shown is a second display 58 coupled to an output of circumvention device 52.

Dashed line 60 depicts a "bypass" mode where the new protection signal is coupled directly to recorder 54 and display 58. In this bypass mode, the new protection signal has little or no artifacts displayed on display 58. In the bypass mode, recorder 54 and a playback monitor show a darkened playback of an illegal copy, or other protection effects such as, for example, AGC gain variation or effect, brightness change, and or turning off (for a compliant device) the recording/viewing process.

However, if the bypass mode is not used, the circumvention device's input 62 is coupled to a video source (via processor circuit 50) with the new (content or Type RP) protection signal(s).

The output of circumvention device 52 then outputs a video signal with a (content or Type RP) protection signal, which in turn causes recorder 54 to exhibit protection effect(s) such as darkening, AGC effect, brightness change, and or shutting down (e.g., compliant device will shut down recording or viewing), and one or more of the following problems:

A clamp error in a portion of the program video signal.
A loss of color burst in one or more active TV lines.
A loss of program video information in one or more active TV lines.
A color unlocking or color distortion in one or more active TV lines.
A new or increased playability artifact(s) when coupled to a TV display.

It follows that inserting a circumvention device actually causes more video problems than without it when the new protection signal is applied. That is, the new protection signal causes more problems for a video pirate than without the circumvention device. For example, as previously explained, the new protection signal causes the circumvention device to enhance the protection effect, thereby discouraging the making of illegal copies of video programs.

Accordingly, it is noted that one or more of the new protection processes provide resistance to circumvention device(s) (black boxes) or provide enhancement of or synergy to the protection process (or effectiveness).

It should be reiterated that the new protection signal embodiments also reduce playability problems in some monitors. For example, by shifting the copy protection signals toward the vertical sync signal, an overshoot or ringing error in the TV set's phase lock loop feedback system settles down better by the time an active field is displayed.

This better settling time in the horizontal scanning circuits of a TV set is especially applicable to (content) protection signals where there is a position and or pulse-width modulation in the pseudo sync or AGC pulses from one TV line to another, or where the number of pseudo sync or AGC pulses changes from one TV line to another.

Correspondingly, a better settling time in a horizontal display or scanning system provides improved playability of the copy protection signal.

Thus, a prior art waveform (e.g., for PAL or NTSC) that is shifted or moved (e.g., advanced) toward the vertical sync signal, provides better playability. For example, copy protection signals, such as pseudo sync and or AGC pulses that are provided further away from the active field provide less noticeable hooking or tearing at the top of a display screen or in a portion of the overscan area.

For example, one 625 line standard, prior art protection signal, has a Format A that has seven pulse pairs (pseudo sync/AGC) on line 8 (and or lines 10, 12, 14, 16), which is then followed by Format B that has six pulse pairs on line 9 (and or lines 11, 13, 15). An example of Format A is 1.63 microseconds (+/−100 ns) wide for pseudo sync and 7 pseudo sync pulses per line, and or Format B is 1.78 microseconds (+/−100 ns) for pseudo sync and 6 pseudo sync pulses per line, or vice versa. Other numbers or values can be provided. This prior art signal then does not have resistance to certain black boxes and or can be improved in playability.

Thus to provide resistance to or defeat of a circumvention or black box device and or to provide improved playability, one or more embodiments include(s) shifting either (or both) formats A and/or B one or two lines toward the vertical sync signal such as:

1) Format A starting on line 6 (or 318) and/or line 7 (or 319)
2) Format B starting on line 6 (or 318) and/or line 7 (or 319)

Other alternative embodiments include:
Adding/inserting/synthesizing a Format A or Format B protection signal (e.g., starting) on lines 6, 7 and/or 8 and/or lines 318 and/or 319. In one example for a 625 line standard system, lines 6, 8, 10, 12, and or 14 (and/or 16) may be of Format A (or B), while lines 7, 9, 11, 13, and or 15 may be of Format B (or A). Format A represents a set of pseudo sync and or AGC pulses and Format B represents another set of pseudo sync and or AGC pulses.

Note that in general, any type of Format A and/or Format B signals may be provided in one or more selected TV lines, provided with a selected number of pulses (e.g., pseudo sync and or AGC) per line, or provided with selected pulse-width, pulse amplitude, and/or pulse position, for any of the added pulses (or sync pulse(s)). In certain cases Format A equals Format B, for example, for two or more consecutive lines. A protection process including two or more consecutive lines of (substantially) the same format toward the active field comprises an embodiment which improves playability or still causes a problem for circumvention devices. For example, a process can start right after or be delayed less than 2.5 lines after the vertical sync signal, with two formats interweaving/interlacing from one line to another. However, the last two or more lines that include pseudo syncs or protection signals may be a single format. Also, there is no limitation on how many formats can be provided (e.g., one or more formats).

One example (e.g., for improved playability) provides/includes one or more (e.g., 4, 5, 6, or 7) pseudo sync or pseudo sync AGC pulses in three or more TV lines with at least one series of alternating formats in two (or more) lines (e.g., in consecutive lines), while providing two consecutive lines with substantially the same format. For example, a series of TV lines may include A'A'B', B'A'A', A'B'A'B'B', A'A'B'A'B', etc., where A' and B' each denote a particular format. In general, each format includes a particular number of pseudo sync and or AGC pulses per line, and or includes pseudo sync and or AGC pulse width and or position. U.S. Pat. No. 6,836,549 by Quan and Brill issued on Dec. 28, 2004, incorporated by reference, describes various methods and apparatuses for modulating in position, pulse width, and or amplitude of sync/pseudo sync and or AGC pulses, or changing the number of protection signals from one line to another, or gap-width modulation. Any example may include one or more of the various methods or apparatuses as described above for U.S. Pat. No. 6,836,549.

In any of the processes/embodiments mentioned (e.g., protection signals that provide resistance to circumvention and or improved playability), one or more of the following may be provided/generated/inserted/added to illustrate a further method and or apparatus combination.

1) Modulating any of the protection pulses such as, for example, pseudo sync and or AGC pulses, by amplitude (e.g., may include a finite value and or zero amplitude), pulse-width, position, and or frequency (e.g., including changing a number of negative or positive going pulses from one video line to another line). Or providing at least one number (e.g., two or more different numbers) of pseudo sync and or AGC pulses per TV line interval in selected (e.g., two or more) TV lines.

2) Changing or shifting a portion of a video signal from one video line to another line such as, for example, lowering or raising a blanking or black level from one line to another line or from one set of lines to another set of lines. U.S. Pat. No. 5,583,936 by Wonfor et al. issued Dec. 10, 1996 and its divisional and continuation patents, incorporated by reference, describe modifying a basic protection signal (e.g., AGC pulses and or pseudo sync/AGC pulses) with level shifting a portion of the video signal, including a portion of the active video signal and or a portion of one or more blanking intervals, for example, a portion of front and or back porch region.

3) Adding or providing a color burst modification of at least a portion of one or more color burst envelopes. The modification may include phase, frequency, and or amplitude of one or more cycles of subcarrier, or may include adding cycles of subcarrier (e.g., widened (modified or unmodified) color burst envelope) or a reduced duration color burst envelope (modified or unmodified). One or more color burst modification is shown in U.S. Pat. No. 6,516,132 by Wrobleski and Quan issued Feb. 4, 2003, incorporated by reference, and/or U.S. Pat. No. 7,039,294 by Quan issued May 2, 2006, (incorporated by reference. An example comprises segmentation of one or more color burst envelopes with two or more phases (e.g., normal and non-normal phase), and/or addition of extra cycles of subcarrier in one or more horizontal blanking intervals, which can provide an extended (modified) color burst. Also sync position and or width may be altered.

4) Combining content control or protection signal(s) (e.g., back porch pulses, AGC pulses, data, CGMS, flag signal, and or pseudo sync pulses) with other TV standards such as progressive (e.g., 240p, 480p, and or 576p), HDTV, and or low definition TV. Flag signals, data signals, and or protection signals for detection or use in a content control device/system is described in U.S. Pat. No. 5,315,448 by Ryan, issued May 24, 1994 and incorporated by reference.

5) Providing dynamic blanking or modification of a video signal (e.g., one or more active field video line or one or more color burst in an active field) via coupling to a circumvention device by changing or modifying/modulating negative going pulses in a portion of the vertical blanking interval. For example, if negative going pulses near the vertical sync signal are provided or removed (or changed in position, amplitude, or width) as a function of time, the circumvention device will blank a portion of active (field) video lines (and or pass through one or more protection signal) when the negative pulses are provided, and then not blank a portion of active (field) video lines (while reducing an effect of the protection signal(s)) when the negative pulses are not provided. An illustration of providing a dynamic protection signal or effect via a circumvention device would be to alternate/switch in time prior art signals of FIG. 1A or 1B and signals of FIG. 2A or 2B. The output of the circumvention device will then generate a newly provided amplitude modulated (effect) of copy protection signals by modulating (in one to three lines) negative going pulses after a vertical sync signal.

FIGS. 11A through 11D illustrate example apparatuses or systems for implementing in combination with an integrated circuit the various waveforms of description herein, in accordance with the invention.

Figure 11A:
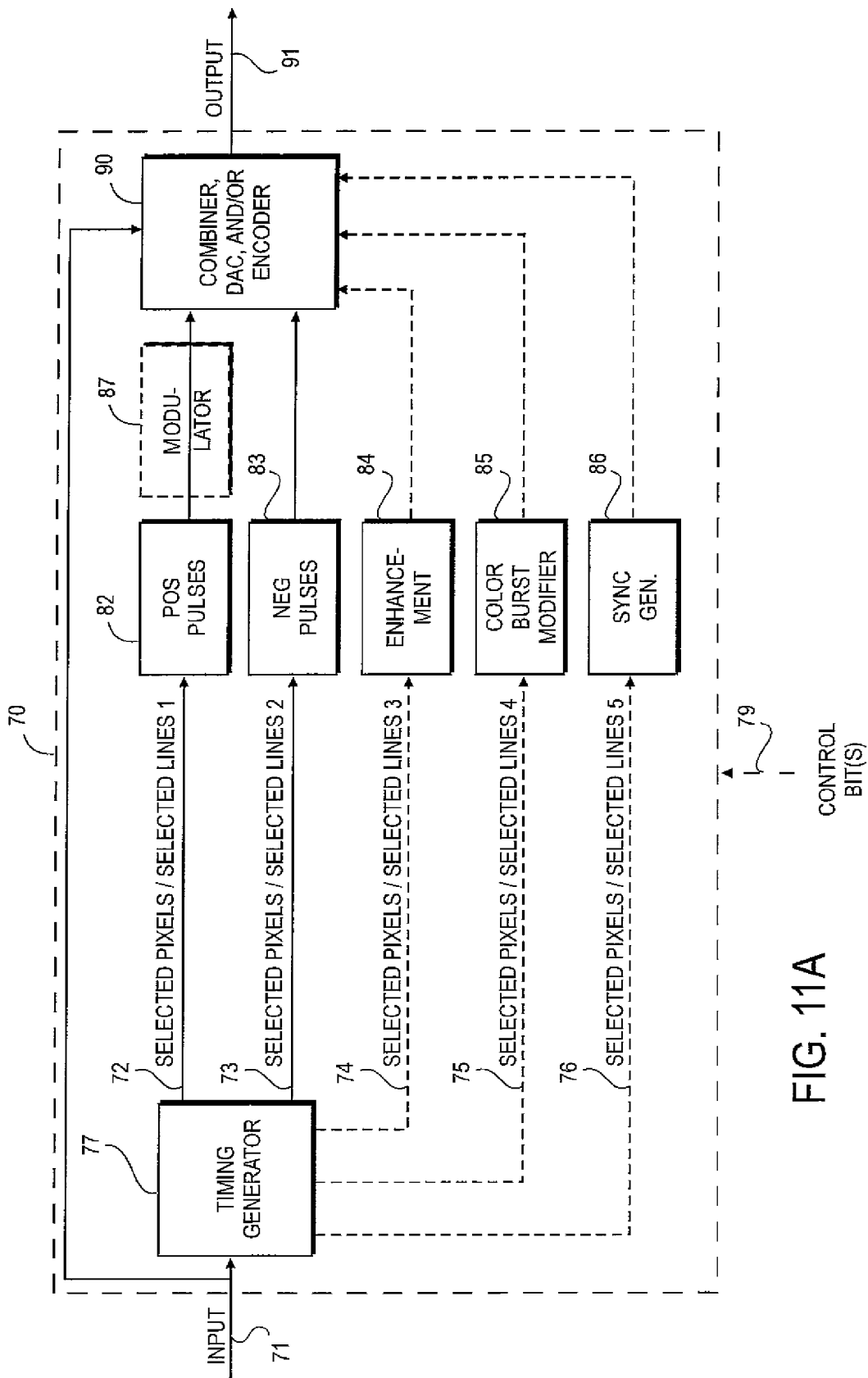
FIGS. 11A-11D illustrate examples of systems or apparatuses for one or more embodiments for implementing the various waveforms of description herein.

In FIG. 11A, video (analog or digital) is supplied or coupled to an input 71. A timing generator circuit 77 receives the video signal via input 71, and produces one or more various timing signals for selected pixels/selected video lines such as provided on leads 72, 73, 74, 75, and or 76.

For example, lead 72 produces a timing signal for providing positive going pulses such as AGC pulses in selected video (TV) lines and selected pixels. The timing signal on lead 72, for instance (in the VBI) can provide a logic high signal for selected pixels on (any combination of) TV lines 317 (or 6), 318 (or 7), and or up to 327 (16) for a 625 line TV standard system, which when coupled to a positive pulse generator 82, provides AGC or positive going pulses to a video output 91 of a combiner, DAC and or encoder circuit 90. Similarly, for a 525 TV line standard system, the video line allocation may include any combination of video lines from 10-20 and/or 272-283. Any of the positive going (e.g., AGC) pulses may be modulated in position, amplitude, and or pulse-width (e.g., within an interval or from one TV line to another) via an optional modulator circuit 87 (shown in dashed line).

For the positive going pulses, lead 72 may include providing an AGC or positive going pulse in a portion of the back porch, or a portion of a horizontal blanking interval, of selected TV lines (e.g., providing back porch pulses). For example, the selected lines may include one or more TV lines in an overscan area, such as a bottom of the TV field, a portion of the VBI, and or a top of the TV field. These back porch pulses may be modulated in position, amplitude, and or pulse-width from one TV line to another via the optional modulator circuit 87. Also, amplitude modulation may be applied to one or more of the back porch pulses.

A signal for selected TV lines and pixels, for providing negative going pulses for one or more embodiments, is supplied on a signal lead 73 that is coupled to a negative pulse generator 83. Generally, in the VBI, the negative going pulses may include the allocation of TV lines mentioned for signal lead 72 above. It should be noted that signal leads 72 and or 73 (via setting the selected pixels) can provide a different number of pulses, positive and or negative going pulses, a position change, and or a pulse-width change. For example, the signals can provide position modulation and or pulse width modulation of pseudo sync and or AGC pulses, from one TV line to another (e.g., in the VBI) for a video output such as on output terminal/connection 91.

Other features may be included in the negative going pulses or pseudo sync pulses that provide a protection signal resistant to certain black boxes. For example, an enhancement signal may be added. To this end, a selected line and or pixel signal lead 74, may provide an enhancement circuit 84 with an increased or modified protection effect via the circuit 90 and output 91. In one example, signal lead 74 provides selected lines and pixels to lower or to level shift (e.g., level shift up or down) at least a portion of the active video signal, and or level shift at least a portion of the front and or back porch region. For example, by level shifting down a portion of one or more TV line(s) lower than a black level or a blanking level compared to another portion of the TV signal, the protection effect or protection signal is modified or enhanced. In one (enhancement) example, one or more portions of one or more active field line(s) is shifted or lowered in black or blanking level compared to the blanking or black level of one or more TV lines in a portion of the VBI.

Another signal modification that may be included with the various embodiments mentioned, that provide content control or protection and or resistance to certain black boxes, is the color burst phase or amplitude modification for selected TV lines. This color burst modification may include segmentation of phases and or amplitudes for providing a modified color burst in one or more horizontal blanking interval(s).

Thus, the timing generator 77 provides a signal on signal lead 75 that allows selected lines and pixels to be modified such that a modified color burst is synthesized via a color burst modifier circuit 85 and combiner, DAC and or encoder circuit 90. Circuit 85 receives a signal on lead 75 to generate a modified color burst for selected lines and portion of the horizontal blanking interval (HBI). The output of circuit 85 may include an analog signal or digital signal.

For example, if the input 71 is analog, the output of circuit 85 may include a color subcarrier generator, which provides a PAL or NTSC modified color burst on selected TV lines and generally normal color burst on another set of TV lines. Should input 71 include a digital signal, circuit 85 may output digital signals to a digital color (subcarrier) encoder (not shown) such as one that would be included in circuit 90, to provide a color burst signal at output 91 that is modified for one set of TV lines and substantially normal color burst on another set of TV lines. The digital color (subcarrier) encoder may provide component video signals (e.g., R-Y, B-Y, I, or Q signals), which are modified in selected TV lines and pixels (e.g., in an HBI portion) to a color subcarrier encoder. The encoder encodes a modified PAL and or NTSC color burst signal such as, for example, color stripe, split burst color stripe, segmented phase/amplitude color burst signal, widened or narrowed color burst or color stripe envelope, and or advanced or delayed color burst or color stripe signal.

Yet another signal modification that may be included with the one or more embodiments mentioned, that provides content control or protection and or resistance to certain black boxes, is sync amplitude, position, pulse width or level shift modification for selected TV lines. A signal lead 76 provides a logic signal for selected lines and pixels to generate sync pulses of selected amplitude, position, level shifting, and or pulse-width via a sync generator circuit 86. In some instances, the protection or protection effect may be increased in effectiveness or modified via sync amplitude reduction and or sync width reduction on one or more TV lines. The output of circuit 86 is then coupled to the circuit 90 to provide a TV signal with one or more modified horizontal and or vertical sync pulse/signal.

Shown in dotted lines in the system 70, is (optionally) an input of one or more control bit(s) or bit pattern on a lead 79 that allows turning the system on or off. For example, the input on lead 79 may provide one or more waveforms such as a negative going pulse, a positive going pulse, an enhancement or modification signal (level shifting one or more portions of a video signal), color burst modification, and or sync modification, or may provide configuring/enabling/disabling the negative and or positive going pulses, or may configure/program/enable/disable an enhancement signal, color burst signal, and or sync signals.

Figure 11B:
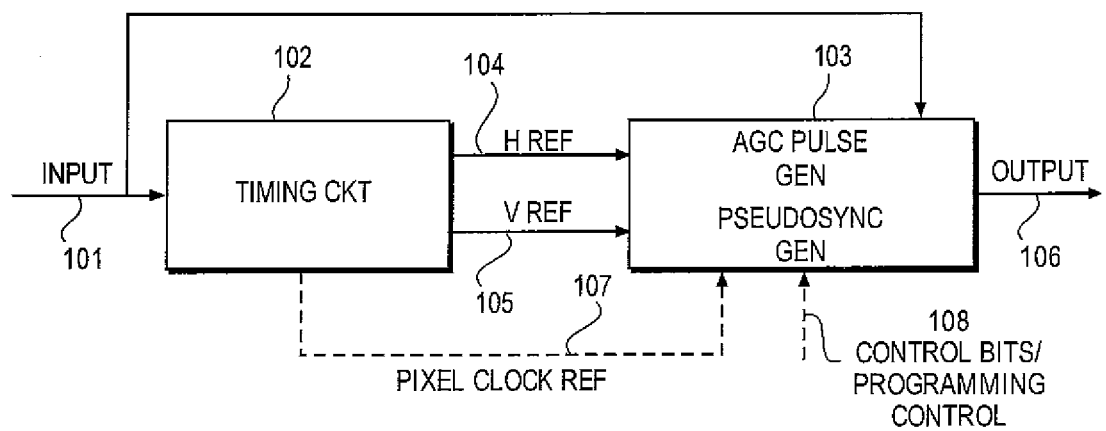

FIG. 11B illustrates another apparatus, which receives an analog or digital signal at input 101. The input 101 is coupled to a timing circuit 102, which outputs horizontal and vertical reference signals 104 and 105 respectively. These reference signals 104 and 105 are then coupled to a pseudo sync pulse generator and AGC pulse generator circuit 103. The timing circuit 102 may also provide a pixel clock reference 107 to the circuit 103. The reference timing signals and also the input signal are coupled to circuit 103 which then provides a video signal with pseudo sync pulses and or AGC pulses at an output 106 that causes certain black boxes to pass at least some of the pseudo sync or pseudo sync and AGC pulses. By causing the black box to pass at least some of the protection pulses, an effective protection or content control signal is provided at the output of the certain black boxes, which is contrary to the design goal or intent of the black box or circumvention device. Circuit 103 may include control or programming from one or more control or programming signals or bit(s) or bit pattern(s) as depicted at an input 108. For example, in response to a control signal, control bit, or bit pattern 108, the line location, pulse width, pulse position, and or amplitude of pseudo sync and or AGC pulses may be set as by one or more bit pattern(s). A control signal or control bit may enable/disable and or program any of the waveforms and or any other waveform (e.g., enhancement signal, color burst modification, sync modification, etc.) that may be combined with, for example, the integrated circuit (as in a receiving device) in accordance with the invention.

Figure 11C:
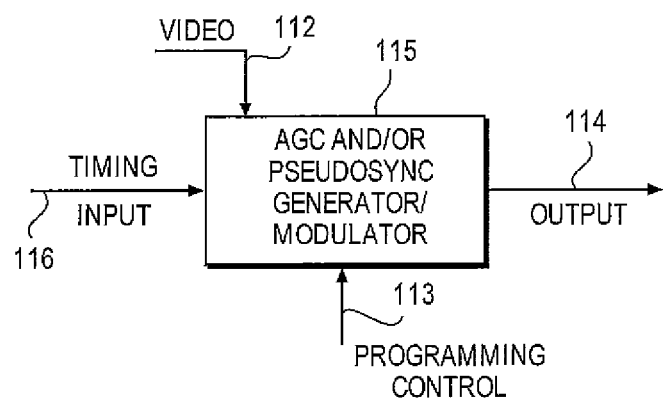

FIG. 11C illustrates a processor (circuit) 115 supplied with an input video signal on line 112 (analog or digital) and a timing signal on a line 116. Processor 115 includes a generator and or modulator. The modulator may modulate pulse width, pulse position, gap width such as between a negative going pulse and a positive going pulse, and or may modulate the amplitude of AGC pulses and or sync/pseudo sync pulses. For example, with the pseudo sync/AGC line locations of previous description, that cause a black box to become ineffective, the pseudo sync and or AGC pulses may be position or pulse width modulated within a video line or from one video line to another. The protection pulses such as AGC pulses may include amplitude modulation. An example output of processor 115 is a signal on output 114, which may include a static or dynamically modulated protection waveform(s), which defeats or reduces one or more effects of a black box, provides resistance to certain black boxes and or which improves on playability. Processor 115 may (also) include an enabling, disabling, and or programmability (control) bit or signal on an input 113 such as previously mentioned for example in FIG. 11A and or FIG. 11B.

Figure 11D:
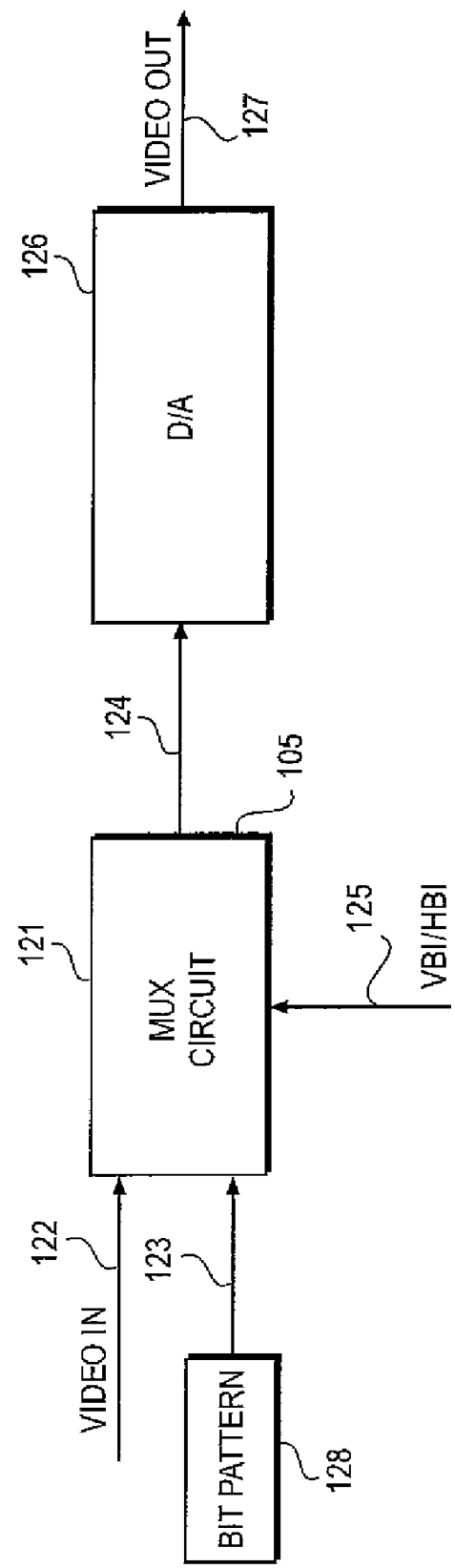

FIG. 11D illustrates an apparatus for use in the digital domain. A digital video signal is coupled to an input 122 of a switching or multiplex (MUX) circuit 121. Another input 123 supplies a bit pattern signal from a bit pattern generator 128, which provides digital words or bytes (or a bit pattern) that switch in various levels to provide negative going and or positive going pulses at an output 127 of a digital to analog converter 126. The circuit 121 also is supplied with a switch or multiplex control signal on an input 125, which is enabled during one or more portions of the VBI and or HBI. For example, during a portion of the VBI, such as immediately after (or up to one line delayed after) a vertical sync signal or equalizing pulse, the bit pattern generator 128 is switched in by the control input 125. Generator/source 128 provides a digital signal such that when circuit 121 is coupled to the digital to analog converter (D/A) 126, pseudo sync and or AGC pulses are provided to the video signal on input 122 with one or more pseudo sync pulses and or AGC pulses from zero to about 1.5 TV line(s) after a post equalizing pulse or after a vertical sync signal, wherein the vertical sync signal includes pre-equalizing syncs, broad sync pulses, and post equalizing syncs. When a portion of the HBI is enabled or turned active, generator 128 can provide a bit pattern which provides an AGC pulse (and/or negative going pulse) in a portion of the back porch or HBI of selected TV lines on the video output 127.

A summary of the (content or Type RP) protection signals and the integrated circuitry of previous and following description is as follows:
1) A method of providing a video protection signal to a video signal to faun a protected video signal which causes a circumvention device to pass at least some of the video protection signal at the output of the circumvention device. The method includes inserting or adding, in at least one TV line, one or more pseudo sync pulses, or one or more pseudo sync pulse/AGC pulse pair signals immediately after a vertical sync signal, or delayed one line or delayed less than 2 or 2.5 lines after a vertical sync signal or post equalizing pulse. It follows that the protected video signal is substantially effective in providing protection or content control after passing through the circumvention device, contrary to the intended function of the circumvention device.

2) Wherein at least one TV line with one or more pseudo sync pulse and or AGC pulse, includes up to 18 TV lines including one or more pseudo sync pulse and or AGC pulse per TV line, or wherein the number of pseudo sync and or AGC pulses changes from one TV line to another TV line.

3) Wherein the copy protected video signal is a composite, component, PAL, NTSC or SECAM copy protected video signal, or wherein horizontal sync(s), pseudo sync(s), and or AGC signal(s) are position, pulse-width, and or amplitude modulated from one TV line to another TV line, or within a TV line.

4) Wherein the circumvention device adds or enhances protection effectiveness after processing the protected signal.

5) Wherein the circumvention device further blanks a portion of the active video field.

6) Wherein the circumvention device further blanks out color burst signals in one or more TV lines in the active TV field.

7) Wherein one or more TV lines in the active TV field exhibit color distortion via the circumvention device.

8) Wherein the protected signal includes improved playability over a copy protected video signal which inserts pseudo sync pulses two or more lines after the vertical sync signal.

9) An apparatus for providing a (Type RP) video protection signal to a video signal to form a (Type RP) protected video signal which causes a circumvention device to pass at least some of the (Type RP) video protection signal at the output of the circumvention device. The apparatus includes a processing circuit receiving a video signal, for inserting or adding one or more pseudo sync pulses or pseudo sync/AGC pulse pair signals in at least one TV line immediately after, or one line or less than 2 or 2.5 lines after, a vertical sync signal or post equalizing pulse, to provide the (Type RP) protected video signal.

As mentioned previously, the invention involves providing a protection signal in combination with an integrated circuit (as in a receiver), and including pseudo sync and AGC pulses for a pulse pair signal, wherein a location of the pseudo sync pulses provides resistance to a circumvention device, wherein the circumvention device passes at least one pulse pair signal, and wherein the location of pseudo sync signals start immediately after or less than 2 or 2.5 lines after a vertical sync signal or post equalizing pulse. The combination includes one or more of the following: a color burst modification of whole or segmented sections of one or more color burst envelope which includes one or more cycles of incorrect color burst, level shifting a portion of the video signal including lowering or raising one or more portions of the video signal, modifying sync location, amplitude, and or pulse width at selected TV lines, providing back porch pulses of different video levels from one TV line to another, providing pseudo sync and or AGC pulses of different pulse widths from one TV line to another, providing pseudo sync and or AGC pulses of different numbers from one TV line to another.

Thus, an integrated circuit in combination with the protection signals of previous description, causes a circumvention device to modify the video signal so as to increase protection effectiveness while passing at least part of the protection signal to maintain copy protection effectiveness from the protection signal. The increased effectiveness provided by the circumvention device includes modifying one or more color burst signals to cause new color distortion, and or blanking/modifying a portion of the visible view area, by starting the (Type RP or content) protection signals immediately after or less than 2 or 2.5 lines after a vertical sync signal or post equalizing pulse.

In terms of chroma effects, an embodiment of the invention includes increasing color protection effects of a protection signal provided by a circumvention device, wherein the protection signal includes color burst modification in selected TV lines, and wherein the color burst modification causes a recorder or TV set to produce color distortion. This process includes combining pseudo sync and or pseudo sync and or AGC pulses immediately after or less than 2 or 2.5 lines after a vertical sync signal or post equalizing pulse with the color burst modification. The color burst modification includes cycles of incorrect phase or frequency in selected TV lines, wherein the circumvention device outputs a protection signal which produces color distortions of the modified color burst in the protection signal and extra color distortion due to blanking or modifying color burst envelopes in an active field caused by the circumvention device. For example, the circumvention device senses the pseudo sync signals to cause incorrect blanking or modification of the protection signal, which may include passing some or all of the pseudo sync and or AGC signals to the output of the circumvention device.

Circuitry for any of the above embodiments, methods, and or apparatuses may be included in an integrated circuit or part of an integrated circuit, as in the receiver. Ergo, media players, tuners, receivers, optical storage players or recorders, hard drive or magnetic storage players or recorders, solid state memory recorders or players, receivers, recorders, cell phones, TV sets, etc. may include the integrated circuit or circuitry to provide at least a part of any of the waveforms or embodiments of previous description herein. Such waveforms or embodiments, when utilized in an integrated circuit in accordance with the present invention, provide resistance to certain circumvention devices and or improve signal playability. For example, playability is improved over prior art protection signals in terms of less hooking or via less scanning error in a TV display.

To this end, FIG. 12A illustrates a receiver 130 with a video source 131, and including an encoding and or digital to analog converter (DAC) 132. A receiver may include a set top box, TV set, mobile TV device, cell phone, and or the like. The receiver 130 provides a video output with one or more of the waveforms (e.g., the protection signals) previously described herein which provide resistance to a circumvention device, provide enhanced protection, or provide improved playability in a protected video signal. The video source 131 may be video programming or a video program from a digital delivery network, Internet, LAN, WiFi, wireless, WiMax, and or a system operator. The video source may provide a digital video signal, RF (video) signal, and or a composite, component, or S video signal. The encoder and or DAC 132 is coupled to the video source 131 and typically provides a video signal (Video out 1) with one or more of the waveforms previously mentioned, to provide a copy protected video signal. This (content or Type RP) protected video signal may be "on" by default (e.g., any of the inventive protection signals can be provided to the output of the media player upon applying power) or turned on by one or more control bits within the video source 131 or from internal or external signal(s).

Control bit(s) may select one or more waveforms or video signal modifications for the Video out 1. For instance, in the field 2 of a 525 line system, one or more pseudo sync pulse may be inserted or added in video line 9 (e.g., FIGS. 12A, 12B, 12C, and or 12D) to cause a circumvention device to pass the protection signals to the output thereof and or to cause the circumvention device to attenuate (and or level shift) a number (e.g., >=1) of active or viewable video line(s), to provide an enhanced protection effect.

FIG. 12B illustrates a receiver 130' that includes a protection bit detector, such as an AC bit detector 135. Here the AC bit detector 135 reads or senses a digital bit stream from the video source 131. For example, upon sensing one or more bit(s), the output of video source 131 sends a command or signal via the bit detector 135 to a (Type RP or content control) signal generator 133 to provide one or more signals, or video signal modifications as previously mentioned, to a DAC (digital to analog converter) 134. The DAC 134 outputs a protected video signal (Video out 2), which provides resistance to a circumvention device, enhances a protection effect via the circumvention device, and or provides improved playability of the protected video signal. Note that DAC 134 may be coupled to the video source 131, as depicted in dashed line.

Figure 12C:
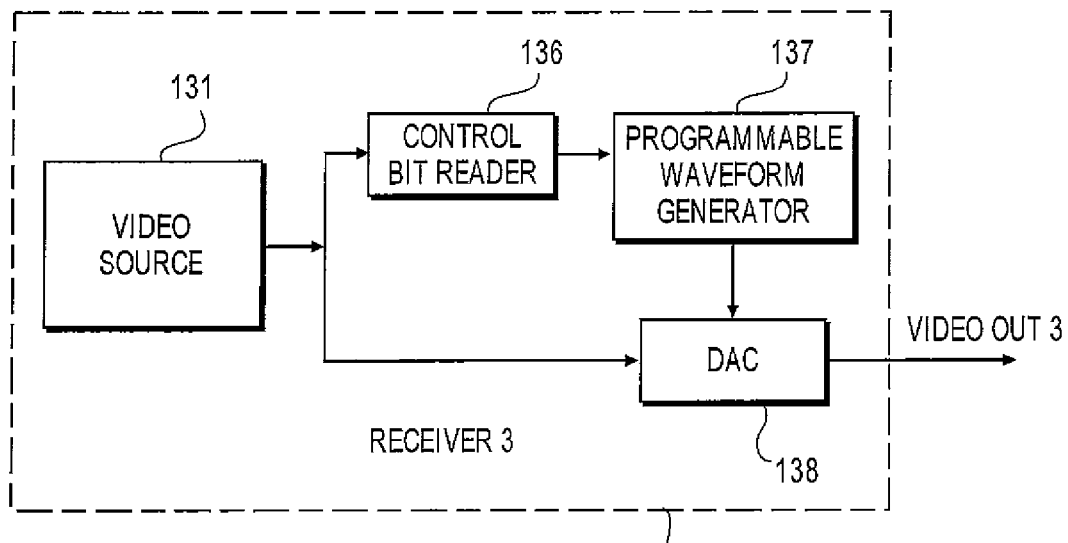

FIG. 12C illustrates an expanded example 130" of the receiver of FIG. 12B. Here a more flexible programmability of the protected video signal is provided. The video source 131 is coupled to a control bit(s) reader/sensing circuit 136, which provides typically one or more signals to program various parameters of the protected video signal. The circuit 136 is coupled to a programmable waveform generator 137 which provides the flexibility to program one or more copy protected video signals. The output of generator 137 is coupled to an encoding and or DAC 138. Also the DAC 138 may be coupled to the video source (e.g., playback mechanism or media reader). The output of DAC 138 (Video out 3) then provides a protected waveform with programmability to provide resistance to a circumvention device, enhance a protected video signal via the circumvention device, and or provide improved playability of the protected video signal.

Programmability for example via the waveform generator 137 may include using a bit pattern or one or more APS bits to implement a Type-n signal. For instance, a Type 1 signal may include pseudo sync pulses in selected TV lines that cause a circumvention device to fail fully or partially. Alternatively, a type 1 signal may cause a circumvention device to further enhance a protected signal by altering portions of the video signal, such as by attenuating, blanking, and or level shifting TV line(s) associated with an active field. A Type 1 signal may include sync reduction in selected TV lines, lowered front porch level in selected lines, and or lower back porch level in selected lines. In terms of modification to pixels or portions of the active line, an embodiment of the invention may include a setup level (e.g., 7.5 IRE in a 525 line system) or pedestal in the range of 1-25 IRE for one set of TV lines, and another set of TV lines (e.g., at least one line prior to a vertical sync signal or pre equalizing pulse) that does not include a set up level or pedestal (e.g., around blanking level or below blanking level).

A Type 2 (protected video) signal may include a Type 1 signal with a first type of color burst modification (e.g., partial, full or split burst color stripe signal). Or a Type 3 signal may include a second type of color burst modification signal along with a Type 1 signal.

Programmability, for example, via the waveform generator 137, may include line assignment of the pseudo sync pulses, number of pseudo sync pulses per line, position of pseudo sync pulses, and or width of pseudo sync pulses. Programmability may include a negative or positive voltage level to be assigned selected lines for front and or back porch region(s). U.S. Pat. Nos. 5,583,936 ('936) and 7,050,698 ('698) relate to adding or inserting a lowering signal in the front and or back porch area. Both patents are incorporated by reference.

Lowering and or raising levels in one or more selected portion of the video signal outside a horizontal blanking interval may be part of a programming capability (e.g., of a waveform generator or biasing circuit). For example, a portion (blanking level, front or back porch) of the VBI (vertical blanking interval) may be raised or lowered with respect of one or more lines outside the VBI. (or vice versa).

For a color burst modification, programmability may include line assignment for the modified color burst and or unmodified color burst, phase angle, zone(s) of correct or incorrect phase, and or duration of one or more zones. Such variation of a color burst is disclosed in U.S. Pat. Nos. 6,516, 132 ('132) and or 7,039,294 ('294). Both of these patents are incorporated by reference.

Figure 12D:
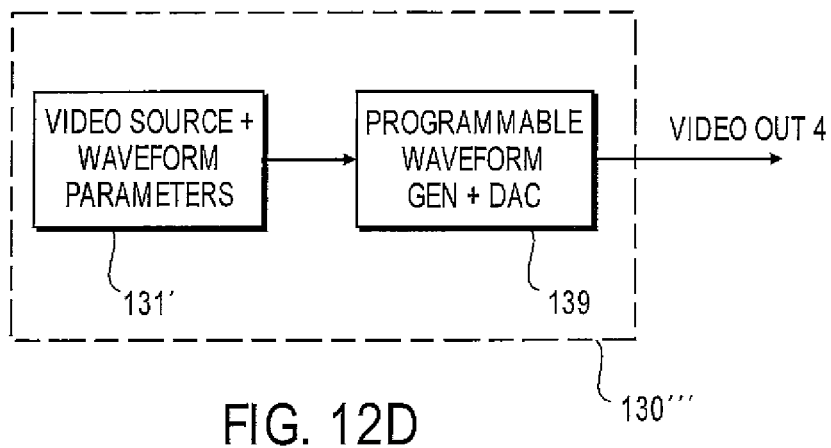

FIG. 12D illustrates another receiving device 130'''. Here, a video source 131' is coupled to a programmable waveform generator and DAC 139, and includes information (bit or bits) which allows programming the (Type RP or content) protected waveform. The video source 131' thus may include solid state, optical, and or magnetic memory, which contain programming information (or actual waveform(s)) for instance to provide flexible implementation of the protected waveform, which can change from one recorded media version to another. For example, not only will the copy protected waveforms from the programmable waveform generator/DAC 139 provide resistance to circumvention devices, enhance (content) protection, and or improve playability, the (content) protected waveform(s) may be updated to a new waveform to further improve effectiveness of a VCR and or circumvention device, or to provide further improved playability. U.S. Patent Publication Nos. 2006/0085863 and 2006/0083373 describe examples of programmability of protection signals from the media or external sources. For example, for a media player and or receiver, updating its protection signal(s), and or modification to the video signal, is provided via any combination of media, memory device, storage device, Internet, digital network, computer, etc. Both applications are incorporated by reference.

Figure 12E:
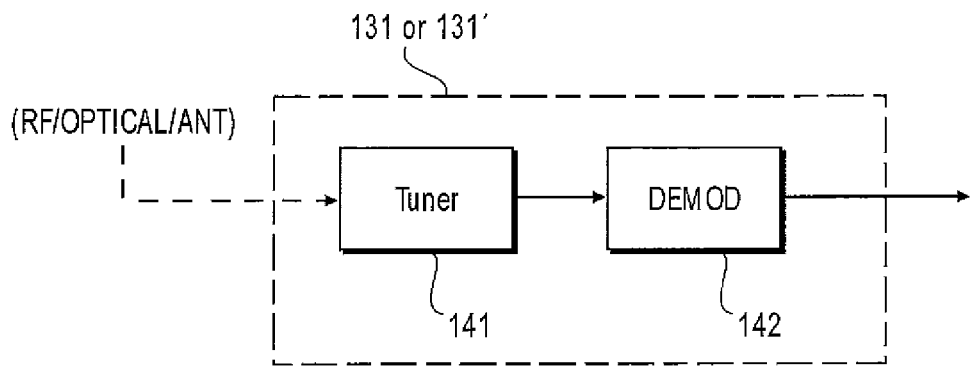

FIG. 12E illustrates an example of a video source or part of a receiver that has a signal source such as an antenna, RF source, and or optical link that is coupled to an input of tuner 141. The output of the tuner 141 is coupled to a demodulator (DEMOD) 142. Typical demodulators 142 may include a circuit for I and or Q demodulation, phase demodulation, amplitude demodulation, frequency demodulation, and or pulse code demodulation. The block 131 or 131' may include a decompression system for MPEG-x, H.26x, advanced video coding (AVC), wavelet, DCT, DFT, motion JPEG, motion GIF, and or the like. The output of demodulator 142 is typically a digital video signal (but may include an analog video output).

In any of the receiving devices of FIGS. 12A-12E, changes to the (content or Type RP) protection waveform may be implemented by an internal or external signal source, such as a link to a transmission site or a "smart card," memory circuit or similar device.

U.S. Pat. Nos. 6,381,747 and 7,395,545, which describe a receiving system pertaining to providing signal modifications for video protection or content control, are incorporated by reference.

Figure 13:
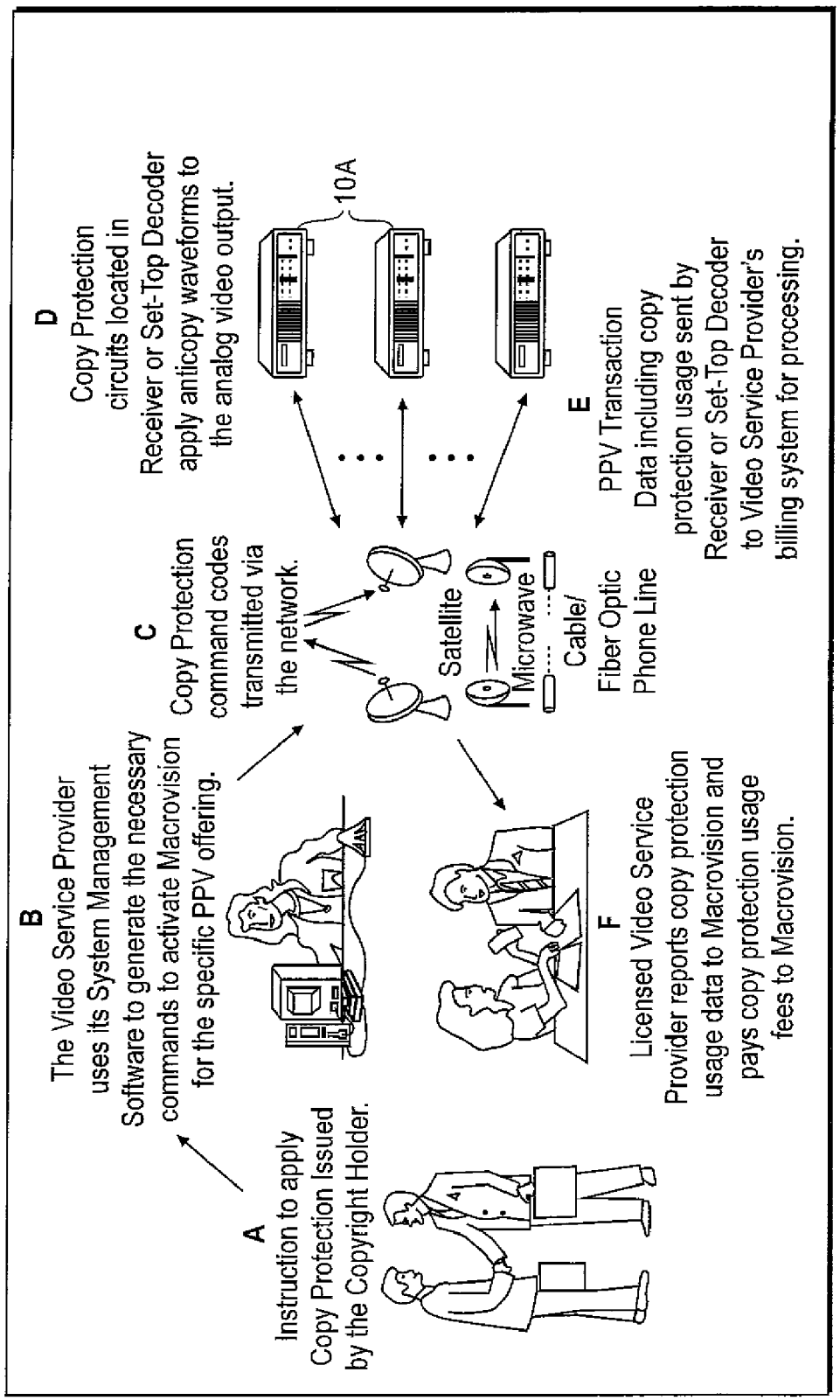
FIGS. 13, 14, 15, and 16A-16C illustrate various embodiments of the invention.

FIG. 13 illustrates a control and tracking method and system for enabling and controlling the application of protection of video signals and the like via digital video networks. Station A represents the issuance of instructions to video service providers by program rights holders who hold the copyrights, for the application by the providers of copy protection to the programs which are protected by pay-per-view (PPV) or pay-to-tape (PTT) requirements.

Station B depicts a control and billing center of the licensed video service providers who supply protection control software for the respective protected programs being broadcast, to generate the commands required to activate, control and reconfigure the copy protection process for each specific PPV/PTT program offering. Although a single provider is depicted, it is understood that station B represents any plurality of video service providers each with their respective proprietary control and tracking (billing) software, in accordance with the present invention.

Station C represents the procedure of transmitting the particular protection command codes of the respective providers, for the PPV/PTT program offerings, via the typical broadcasting networks. Such transmissions may be made by satellite, by microwave, by phone line or by cable transmission systems as depicted.

Station D represents the subscriber's home, or other receiving facility, and includes a set-top box 10A for each of a multitude of subscribers. Each set-top box contains (content or Type RP) protection circuitry including a digital color encoder integrated chip (IC), which is adapted to apply selected anticopy waveforms to the analog or digital video signal which is supplied therefrom to a television set or monitor. The receiving facility is further described in FIG. 14.

Station E represents the procedure whereby data identifying each PPV or PTT transaction, including (content) protection usage, is sent by the set-top box 10A back through the transmission networks of station C, generally to the respective video service provider's control and billing (tracking) center. The center includes billing procedures which are a subset of the system control software and which process the return transaction data to provide for billing the subscriber for the PPV or PTT transaction usage.

Station F represents the procedure whereby each of the licensed video service providers report the (content) protection usage to the program rights holder, whereby the provider pays the (content) protection fees to the rights holder, e.g., the licensor.

Figure 14:
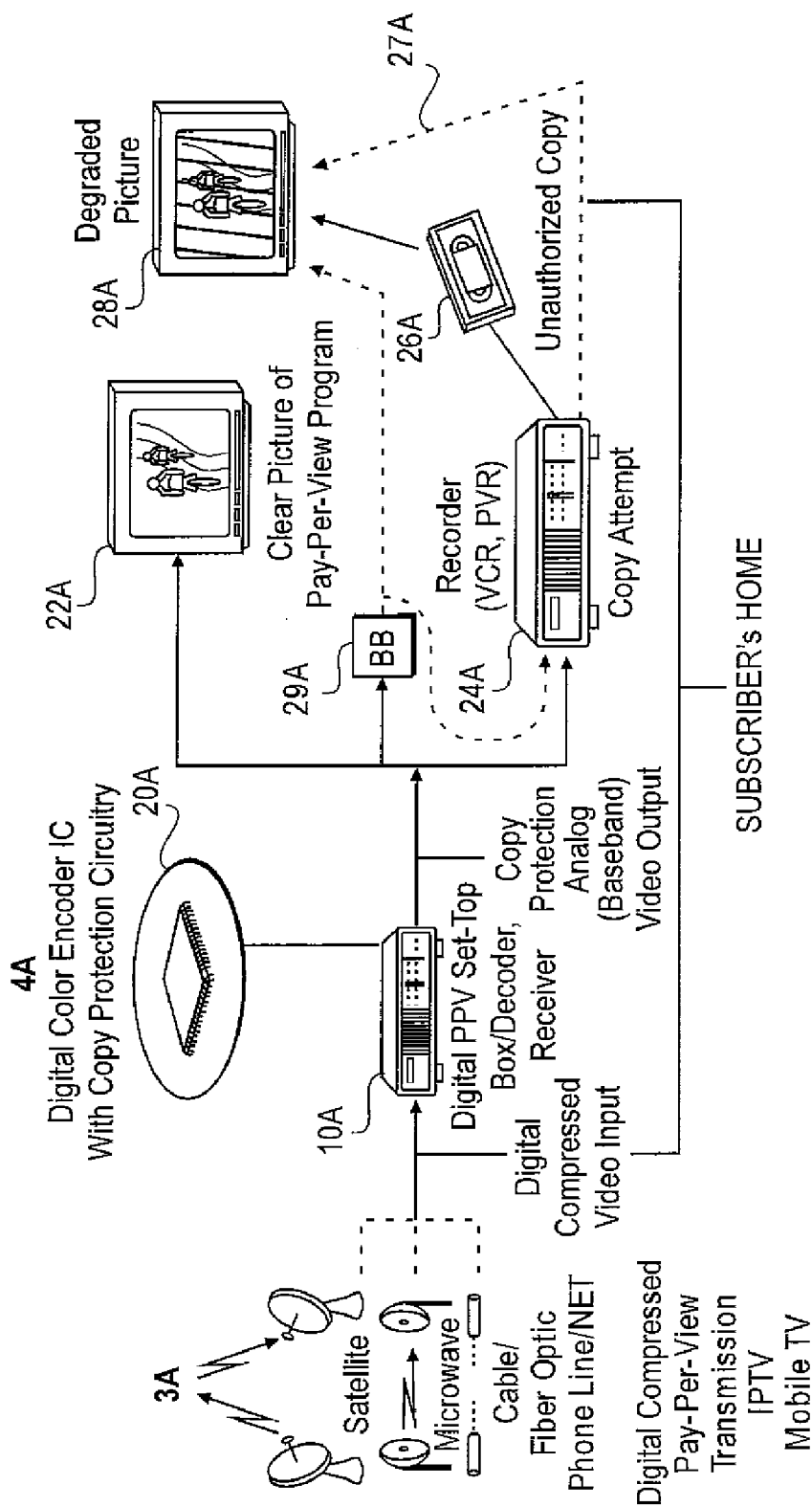

FIG. 14 illustrates in further detail the subscriber's facility, station D of FIG. 13, receiving the digital, and usually compressed, pay-per-view transmissions from the broadcasting networks depicted as station C of FIG. 13. The compressed digital video signal, or the like, is supplied to the respective set-top box 10A of a multitude of set-top boxes, wherein each box includes conventional circuits for converting and decoding the digital compressed video signal to a (baseband) video signal. The set-top box 10A also includes a digital color encoder IC 20A of previous mention which contains (content or Type RP) protection circuitry for applying the selected (content or Type RP) protection waveforms to the analog (or digital) video signal, namely, the programs which are being protected. In this example, the protected baseband video is supplied by the set-top box to a TV set 22A where the pay-per-view protected program clearly is displayed for viewing if the subscriber is authorized to view the program. If the subscriber is not authorized for a particular PPV protected program, the corresponding picture is modified so as to be un-viewable.

In the event a subscriber records the PPV protected program via a VCR 24A to obtain a taped recording 26A without authorization, the unauthorized recording is degraded to the degree that it is un-watchable (or unusable), as depicted by a TV set 28A. In another example, recorder 24A may be a compliant recorder (e.g., a recorder with a content control system), and upon reading video signal modifications from set-top box 10A, the recorder 24A may shut down recording, limit recording, and or provide an altered resolution or quality in recording (dashed line 27A). However, if the subscriber subscribes to a pay-to-tape or pay to record transaction and to the required higher PTT transaction fee, then the copy is authorized and the resulting (taped or recorded) recording would readily be watchable.

FIG. 14 also shows an example of a circumvention device, BB (Black Box) 29A whose input is coupled to the output of set-top box 10A, and whose output is coupled to TV monitor/receiver 28A or to recorder 24A. In this example, the circumvention device will produce and/or supply a degraded signal or image (e.g., color problem or distortion and or blanked portion of active TV line(s) in the top of the active TV field) to the monitor 28A, because the black box 29A responds to the (content or Type RP) protection or content control signals from set-top box 10A as to cause the circumvention device to (unwittingly) enhance (and or pass/allow) the content control or protection signals from set-top box 10A. Accordingly, should the output of circumvention device 29A be coupled to recorder 24A, the recorder will still produce a poor copy or cause the recorder 24A to limit recording, shut down recording, or produce an altered resolution TV signal.

Figure 15:
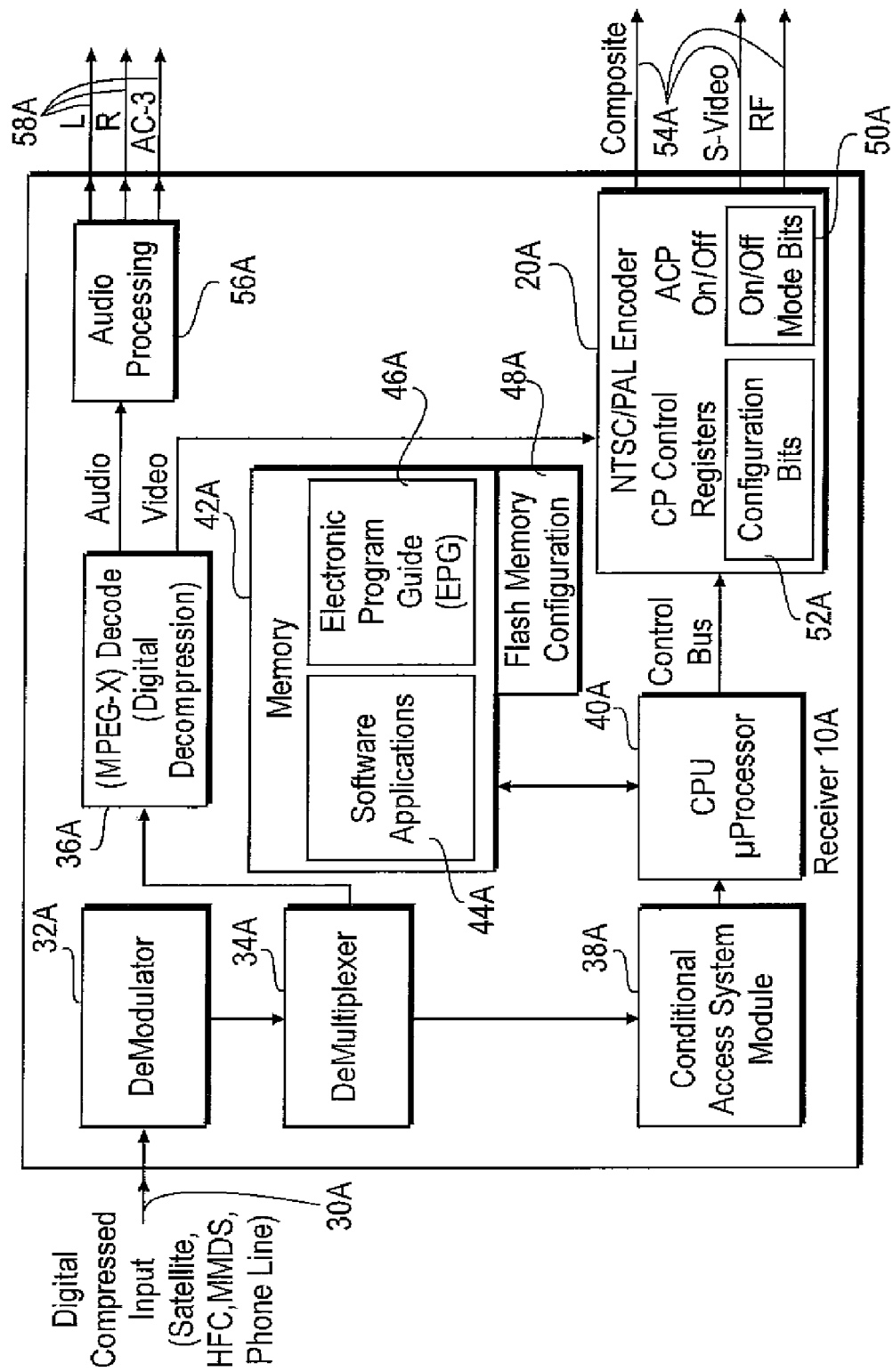

Referring to FIG. 15, there is illustrated in further detail an architecture of the set-top box(es) 10A of FIGS. 13, 14. Upon power up of the set-top box 10A, the configuration bits stored in flash memory 48A are read and written into the appropriate CP (e.g., content protection) control registers 52A in the NTSC/PAL encoder 20A. When the compressed digital video signal, including the protection control commands of previous and following discussion, are supplied by the delivery network of previous mention (satellite, HFC, MMDS, phone line) to a demodulator circuit 32A, as depicted by an input lead 30A. The demodulated video/audio and control signals are supplied to a demultiplexer circuit 34A where the video/audio signals are separated into respective channels and supplied to an MPEG-2 decoder and digital decompression circuit 36A. The (content or Type RP) protection control commands are supplied from the demultiplexer 34A to a conditional access system module 38A. The commands are supplied to a microprocessor in a CPU 40A. The CPU processes information located in memory that is associated with the Electronic Program Guide (EPG) 46A or runs the (content or Type RP) protection application software 44A residing in memory 42A to deliver the activation command to the NTSC/PAL encoder 20A. The EPG may also have data which is used to determine if (content or Type RP) protection should be activated. There are additional methods that may be employed to activate (content or Type RP) protection.

In response to the control commands, the CPU 40A supplies control signals to the NTSC/PAL encoder IC 20A of previous mention, FIG. 14. The encoder IC 20A includes (content or Type RP) protection control registers 50A, 52A for receiving the mode bits and configuration control bits respectively, of previous and following discussion. The configuration bits 52A determine the form of the (content or Type RP) protection (e.g., where the pseudo sync and AGC pulses will be located or positions of the colorstripe lines etc.) The on/off/mode byte 50A determines which components of the (content or Type RP) protection process will be activated. See table 1 below. The encoder IC 20A also receives decompressed video from the MPEG-2 decoder and digital decompression circuit 36A. Encoder IC 20A outputs a RF signal, a composite video signal and/or an S-video signal via video leads 54A. The decompressed audio signal is supplied from the circuit 36A to an audio processing circuit 56A which, in turn, outputs left and right channel stereo signals and/or an AC-3 signal on audio leads 58A.

TABLE 1

Mode Control Bit Listing
Routine On/Off and Mode Selection

| NO | On/off and mode control; 8 bits | | |
|---|---|---|---|
| NO[7] | Reserved | | CPC0[3] |
| NO[6] | Pay-to-tape allowed/prohibited | (Allowed = 1, Default = 0) | CPC0[2] |
| NO[5] | VBI pulses On/Off (VBIP) | (ON = 1) | CPC0[1] |
| NO[4] | End of Field Back Porch Pulses on/off (EOFP) | (ON = 1) | CPC0[0] |
| NO[3] | Colorstripe process On/Off (CSP) | (ON = 1) | CPC1[3] |
| NO[2] | AGC pulse normal (amplitude cycling)/static mode select (AGCY) | (Cycling = Default = 1) | CPC1[2] |
| NO[1] | H-sync amplitude reduction On/Off (HAMP) | (ON = 1) | CPC1[1] |
| NO[0] | V-sync amplitude reduction On/Off (VAMP) | (ON = 1) | CPC1[0] |

It is preferred in one or more embodiments, a process on/off control is achieved by setting all the individual parameter on/off and mode control bits rather than a master on/off control. This requires that the NO (N-zero) bits in the control bit listing be set as required. Depending on the individual system, this will require the control of from 5 to 8 bits.

The delivery of the mode byte to the set-top box to activate or deactivate the (content or Type RP) protection process may be accomplished in several ways. Each method has its positive aspects as well as its negative aspects. When selecting a mechanism to control the (content or Type RP) protection technology, a service provider selects one of the following means or may develop an entirely new means.

One method may be for the mode byte to be delivered via the conditional access system via the entitlement control message (ECM). Another method might be to include the mode byte in a private data field in the MPEG transport data stream.

Another method may deliver the mode byte in a user defined section of the electronic program guide (EPG 46A) that is not identified in released documentation as controlling (content or Type RP) protection. This method also requires some additional security to keep the memory location of the mode byte from being accessed for unauthorized changes and the setting of a return flag that indicates the actual status of the mode byte when transmitted to the NTSC encoder (20A).

Another method may be a combination of the conditional access ECM and EPG. The transport of the mode byte in the EPG could be combined with two bits within the ECM. To activate the (content or Type RP) protection technology then would require an OR operation between the ECM bits and the EPG bits. If either is set, the (content or Type RP) protection technology, both ECM and EPG would have to indicate that deactivation is necessary.

Table 2 below shows an example of pay-to-tape control options for video programs such as pay-per-view Programs. Note that pay to tape is an equivalence to pay to record. For example, a tape recorder may be equivalently replaced with a recorder (e.g., disk recorder, solid state memory recorder, optical media recorder, magnetic media recorder). In TABLE 2 the taint or phrase copy protection may be substituted with content protection or Type RP signal.

TABLE 2

Pay-per-view and Pay-to-tape Control Options
for Pay-per-view Programs

| Program Descriptor of PPV Program | Consumer Request (Pay-per-view or Pay-to-tape) | Result |
|---|---|---|
| Copy protection NOT required | N/A | ACP off |
| Copy protection REQUIRED Taping NOT permitted | Pay-per-view | ACP will be ON. Pay-per-view transaction cost incurred by consumer. |
| Copy protection REQUIRED Taping NOT permitted | Pay-to-tape | Requested option not available. ACP will be ON. Pay-per-view transaction cost incurred by consumer. |
| Copy protection REQUIRED Taping permitted (at higher transaction cost) | Pay-per-view | ACP will be turned ON by STB control system. Pay-per-view transaction cost incurred by consumer. |
| Copy protection REQUIRED Taping permitted (at higher transaction cost) | Pay-to-tape | ACP will be turned OFF by STB control system. Pay-to-tape transaction cost incurred by consumer. |

Figure 16A:
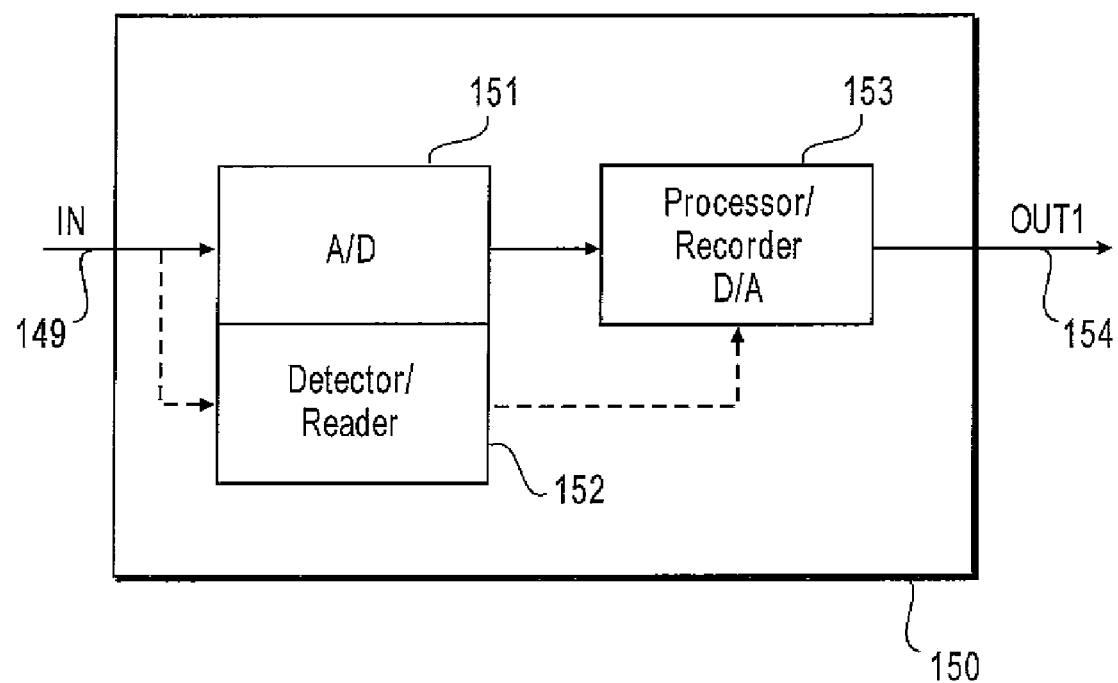

FIG. 16A illustrates an embodiment 150 of the invention for a system, integrated circuit, system on a chip (SOC), and or chip set, which includes a baseband video input 149 coupled to an analog to digital converter (ADC) 151, and a reading or detector circuit 152 for optionally sensing one or more protection signal. Thus, the sensing of the one or more protection signal may be done in the analog and or digital domain. For example, an analog signal on input 149, with one or more protection signal, may be coupled to the detector/reader 152, or may be coupled to the detector/reader 152 via a digital output of analog to digital converter 151. Detector/reader 152 senses the one or more copy protection signal and sends one or more commands to a processor/recorder 153. For example, if a certain protection signal is sensed (e.g., a pseudo sync, AGC pulse and or color burst modification), a command to shut down or limit recording may be sent to processor/recorder 153. In another example, if a protection signal is sensed, a command may be sent to processor/recorder 153 (e.g., a recorder or processing circuit) so as to output for example program video OUT1 via an output 154 with the same type of (content) protection signal, another type of (content) protection signal, a weakened copy protection signal, or effectively no copy protection signal.

Example input signals and output signals for system 150 may include:

Input comprising a video signal with no protection signal, with an output video signal with a new (content or Type RP) protection signal resistant to black boxes and or a new (content or Type RP) protection signal with improved playability.

Input comprising a video signal with a standard protection signal that is not resistant to a black box, with an output video signal with a new protection signal resistant to black boxes and or a new protection signal with improved playability.

Input comprising a video signal with a (content or Type RP) protection signal that is resistant to a black box, with an output video signal with a protection signal not resistant to black boxes, and or a new protection signal with improved playability.

Other combinations of input/output signals are possible for system 150. For example, the input can include a copy protected video signal with improved playability while the output provides a (content) protected video signal without improved playability (wherein the improved playability signal includes any of the (content) protection signals with improved playability), or vice versa.

Figure 16B:
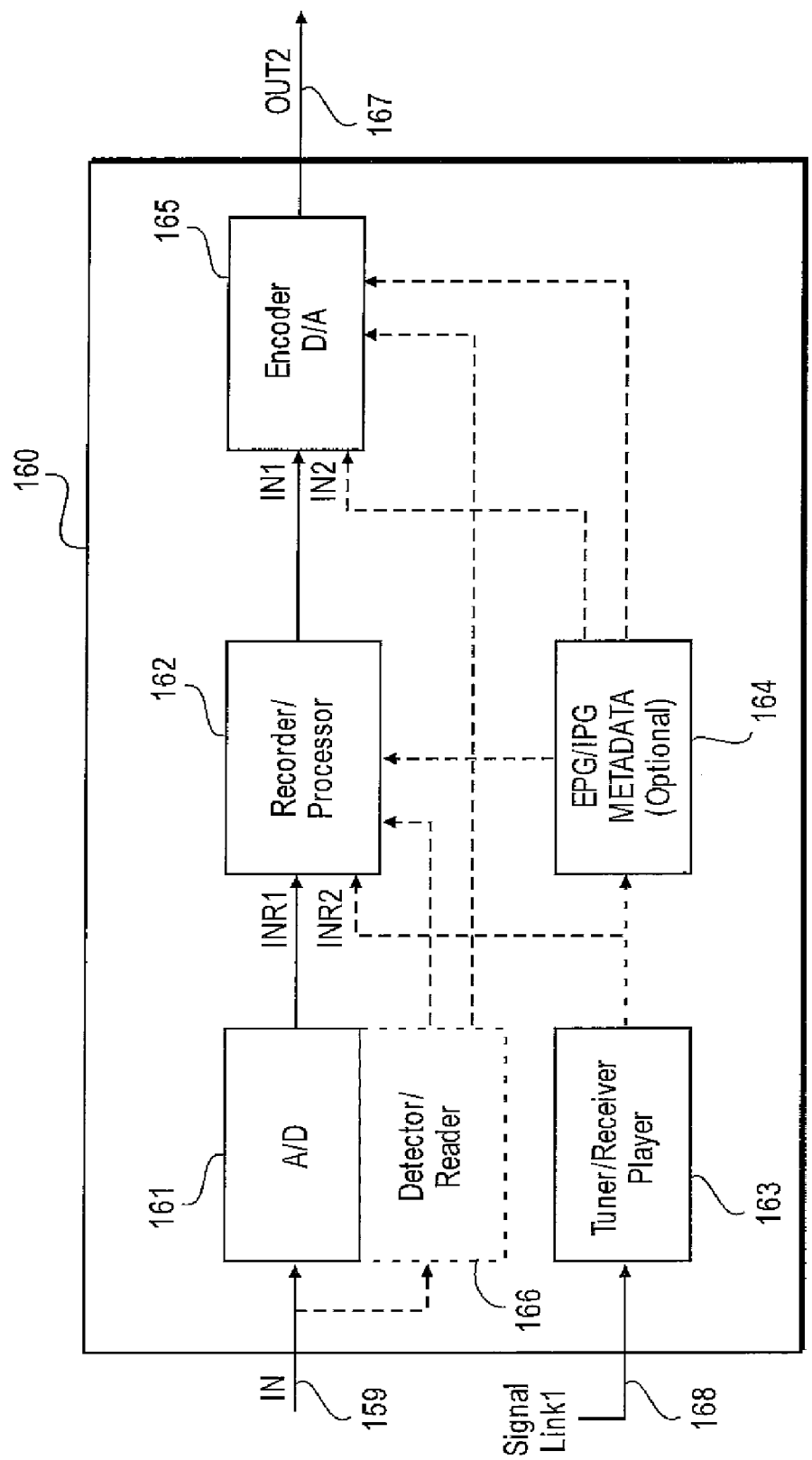

FIG. 16B illustrates a system, integrated circuit, SOC, and or chip set denoted by numeral 160, as an example embodiment of the invention, which like FIG. 16A, also includes optionally a tuner/player device 163 and or, optionally, a system to read signals from at least a portion of metadata, Electronic Programming Guide (EPG), and or Interactive Programming Guide (IPG) for controlling a recorder 162, and or for programming/enabling/disabling a protection signal (e.g., a (content or Type RP) protection signal that provides resistance to a black box). A baseband video signal is coupled via an input 159 to an input of analog to digital convertor (A/D) 161, which optionally may include a detector or reader 166 of content control signal(s) in the baseband video input signal. By sensing signals such as pseudo sync, AGC, or Data (e.g., CGMS) pulses, or color burst modification(s), the detector/reader 166 may provide a command signal to a recorder or processor 162 to perform for example one or more of the following: allow recording/processing, prohibit recording/processing, provide an altered resolution or altered quality recording, provide copying or recording during a specific time or duration, or provide or allow a limited number of recordings. The detector/reader 166 may provide a signal to an encoder/digital to analog converter (DAC) 165 to synthesize one or more (content or Type RP) protection signals in any combination as dependent on the input signal. This may include a baseband input signal or a signal supplied via a processor 164 such as a metadata, IPG, or EPG signal. Alternatively, a default copy protection signal OUT2, such as a (content or Type RP) protection signal that is resistant to a black box, or an improved playability protection signal, may be synthesized on an output 167.

A signal link on an input 168 an RF source, a wireless source, Internet or digital delivery network, phone line, cable, fiber, optical, or satellite, may be coupled to a tuner/receiver 163. Device 163 may include a player, which plays back digital signals. An output of tuner/receiver 163 optionally may be coupled to an input of the recorder or processor 162, or to the optional EPG/IPG/metadata signal processor 164. An output of device 164 may then contain information from EPG/IPG/metadata signal(s) to control processing or recording (for example, for recorder/processor 162) or to program/enable/disable (content or Type RP) protection signal(s) provided from the encoder/DAC 165. The EPG/IPG/metadata may be transmitted or added/inserted in a baseband video signal or may be provided via a digital delivery system (e.g., from a system operator, or as a digital data signal). For example, the at least a portion of a signal including IPG/EPG/metadata, may be used to control a video processing device or recording device, or may be used for programming/enabling/disabling one or more content control signals or (content or Type RP) protection signals, and or for providing a (content) protection signal that provides resistance to a black box or provides improved playability (e.g., as mentioned in one or more embodiments or examples of the invention).

Figure 16C:
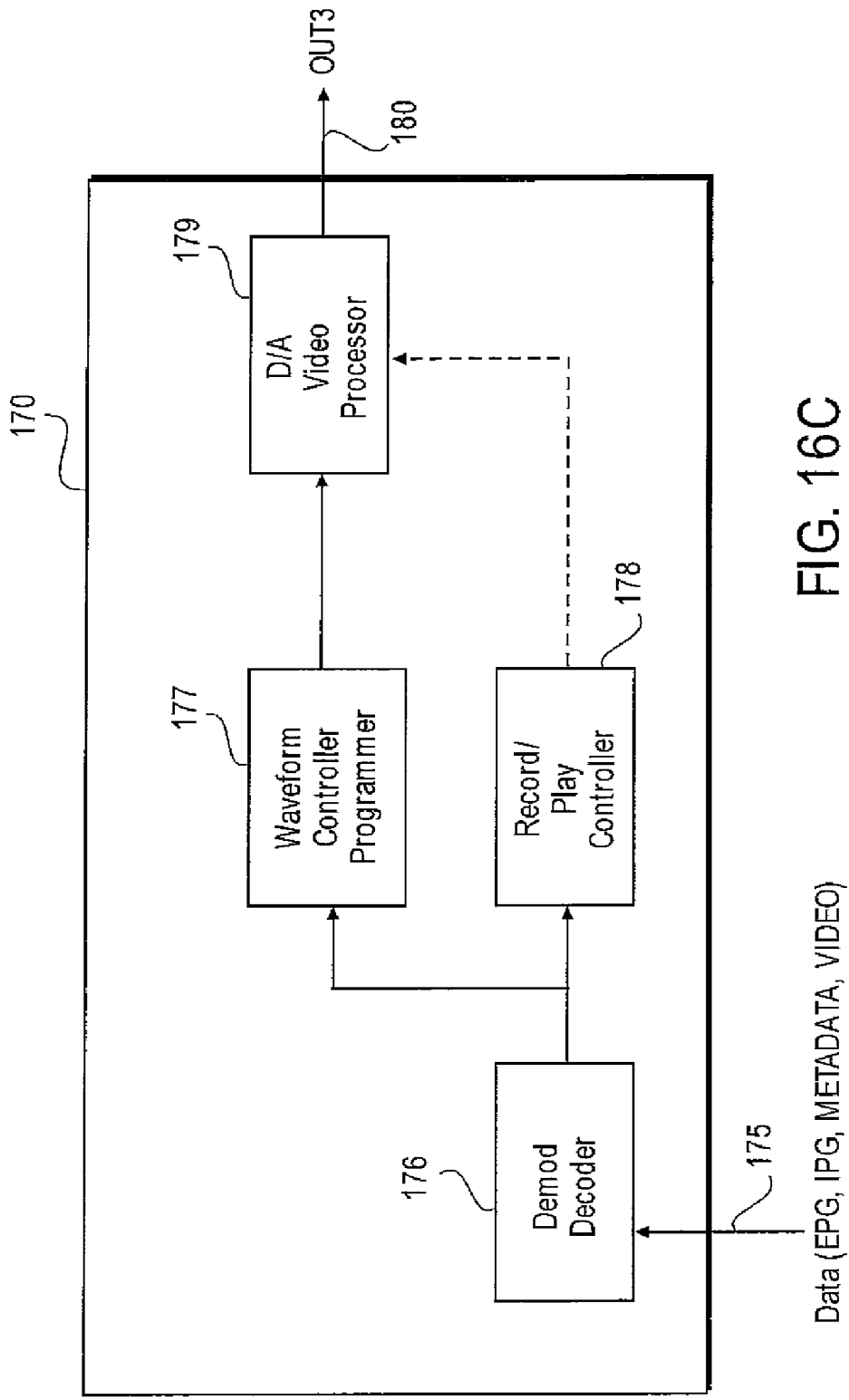

FIG. 16C illustrates another embodiment 170 of the invention including an integrated circuit (IC), SOC, chip set, and or system. A data signal including video, EPG, IPG, and or metadata is coupled via an input 175 to a demodulator or decoder 176. A bit pattern from at least a portion of the data signal from demodulator/decoder 176 is coupled to a waveform controller or programmer 177 to enable/disable/program any number of (content or Type RP) protection signals, and or enhancement signals, which may include a protection signal to provide resistance to a black box, and or to provide improved signal playability.

An output of demodulator/decoder 176 may be coupled to a controller 178 for recording, displaying, and or playing video programs. For example, a bit pattern from metadata, IPG, and or EPG may be used as a command to pass or block a video program signal, and or to alter video quality of the program video signal via a video processor 179. A signal OUT3 on output 180 then includes for example a video signal with a (content or Type RP) protection signal (e.g., triggered or flagged by a bit pattern from a metadata, IPG, or EPG signal via for example a digital delivery network) that provides resistance to a black box, or that provides improved playability.

A summary of one or more embodiment of the invention includes a (content or Type RP) protection signal from an integrated circuit (IC) that improves geometric distortion for better playability, a (content or Type RP) protection signal that reduces or defeats the function of a circumvention device, and or a (content or Type RP) protection signal from an integrated circuit that triggers or causes a circumvention device to enhance protection effect(s). Such (content or Type RP) protection signals may be utilized in an integrated circuit as follows:

An integrated circuit which comprises;
a digital to analog converter coupled to a source of digitally recorded material or digital video for providing a (baseband) video signal from a digital signal, a signal sensing or reader circuit for detecting or reading protection bit, a bit pattern or content control bit(s), and a signal generator for generating a (content or Type RP) protection signal at the output of the digital to analog converter in response to the protection bit, bit pattern, or content control bit(s).

One or more embodiments of the invention includes any of the following characteristics:

The protection signal is supplied via an output of the integrated circuit to an input of the circumvention device, wherein the output of the circumvention device passes at least part of the protection signal sufficiently for a protection or content control effect, and or wherein the output of the circumvention device provides a signal to further distort or blank a portion of an active TV field.

The protected video signal from the integrated circuit is coupled to an input of the circumvention device, wherein the output of the circumvention device supplies a signal that is substantially effective in terms of protection or content control for a video recorder or for a content control system.

A circuit for inserting or adding in at least one TV line one or more pseudo sync pulses or one or more pseudo sync (pulse)/AGC pulse pair signals immediately after or less than two or two and a half lines after a vertical sync signal or post equalizing pulse (e.g., in an odd field, even field, or both fields).

A method of providing a different number of pseudo sync pulses from one video line to another video line and or different pseudo sync pulse widths from one video line to another, generating at least two lines consecutively with substantially the same number of pseudo sync pulses and or substantially the same pseudo sync pulse width (e.g., for improved playability).

A (content or Type RP) protected video signal is supplied to a TV set via an output of the receiving device, wherein improved playability is achieved via reduced hooking on a top portion of the TV.

A method of starting or providing pseudo sync pulses immediately after or less than 2 or 2.5 lines after a vertical sync signal or post equalizing pulse to provide the (content or Type RP) protection signal at an output of the integrated circuit, may include one or more of the following: a color burst modification of whole or segmented portions of one or more color burst envelope which includes one or more cycle of incorrect color burst, level shifting of a portion of the video signal including lowering or raising one or more portions of the video signal, modifying sync location, amplitude, and or pulse width in selected video lines, providing back porch pulses of different video levels from one video line to another, providing pseudo sync and or AGC pulses of different pulse widths from one video line to another, providing pseudo sync and or AGC pulses of different numbers from one video line to another.

The protection signal is supplied via an output of the integrated circuit (IC) (receiver) to an input of the circumvention device, wherein the output of the circumvention device passes at least part of the protection signal sufficiently for a protection or content control effect, and or wherein the output of the circumvention device provides a signal to (further) distort or blank a portion of an active TV field.

Combining pseudo sync and or pseudo sync and automatic gain control (AGC) pulses immediately after a vertical sync signal or less than two or two and a half video lines after a vertical sync signal or post equalizing pulse, with the color burst modification (e.g. color stripe, partial color stripe), which in combination is generated at an output of the integrated circuit, wherein the color burst modification includes cycles of incorrect phase or frequency in selected video lines, wherein the baseband, composite, and or component output of the IC is coupled to an input of the circumvention device, and wherein outputting via the circumvention device a (content or Type RP) protection signal which produces color distortions in the modified color burst of the copy protection signal and extra color distortion due to blanking or modifying of color burst envelopes in an active video field caused by the circumvention device.

It should be noted that an integrated circuit by default may provide one or more protection or content control signal as previously mentioned when power is applied to the device. In another embodiment of the invention an integrated circuit may produce a partial or no protection or content control signal upon power-up, until a network signal (e.g., IPTV, WiMax, WiFi, phone, RF, TV, DTV, HDTV, optical, Internet, router signal, signal from a computer, or the like), or transmission, is received in the integrated circuit. Here for example, one or more (content or Type RP) protection or content control signal is provided (e.g., to provide a more complete or effective protection or content control signal by a video signal) upon reception of a signal by the integrated circuit.

Another embodiment of the invention includes:
An apparatus for programming or enabling or disabling a content control signal derived from a metadata, IPG, and or EPG signal comprising:
a circuit to receive a metadata, IPG, and or EPG signal from a digital delivery network wherein the metadata, IPG, and or EPG signal includes a trigger or flag signal or bit pattern signal, further comprising coupling the trigger, flag, and or bit pattern signal to a processing circuit and or an encoding circuit to provide programming, enabling, or disabling the content control signal at an output of the encoder, wherein the content control signal is added or inserted to a video signal to provide a content controlled video signal and wherein the content controlled video signal provides resistance to a circumvention device.

U.S. Pat. No. 5,479,268 (Young et al, issued Dec. 26, 1995) and US Patent Publication No. US 2003/0149980 (Hassell et al. published Aug. 7, 2003) pertain to programming guides such as EPG and IPG, and are both incorporated by reference. An example EPG (Electronic Programming Guide) or IPG (Interactive Programming Guide), which may be provided or derived via an IPG/EPG signal, comprises a method or apparatus for allowing a user to select one or more (favorite) channel that includes providing (to) a display (e.g., via a screen) a plurality of cells representing a corresponding plurality of channels available for viewing by the user, wherein each cell comprises a channel number and or a program service name for a particular channel of the plurality of channels. The user is allowed to use the display to select a channel among the plurality of channels; for example, changing a status of said selected channel to that of a favorite channel (is) in response to the user selection, or displaying in cells corresponding to the favorite channels a visual indication that the selected channels are favorite channels, and providing program guide information for the subset of channels having said favorite status in response to a user indication to view the program guide information.

Another example of an EPG or IPG (derived from an EGP or IPG signal) includes a method or apparatus for navigating about a television or video listing comprising one or more steps of: storing in (electronic) memory a plurality of television or video program listings; each listing including title, telecast time, and or channel; displaying on a monitor screen some of titles of the program listings in a grid format of time and channel; moving a cursor on the screen to mark one (or more) of the displayed titles in the grid guide format; opening to the marked title in a single (or multiple) format, which may be instead of the (original) grid guide format wherein the single channel format includes rows (or columns) of sequential television or video program listings for the channel corresponding to the marked title; (additionally) comprising moving the cursor on the screen to mark a different displayed title in the single channel format; any of the previous steps wherein the storing step stores programming listings and or the displaying step displays simultaneously with the program listings the program notes corresponding to the marked title.

A grid pattern or cell may include straight or curved segments. Alternatively, a two dimensional grid pattern may be transformed to a three dimensional grid pattern or vice versa. A grid pattern may include three and or two dimensional properties. For example, one cell to another cell in the programming guide may be represented in a curved surface and or a solid object's sides. Cells may be of regular and or irregular shape(s).

FIG. 16B includes a recorder apparatus and use of EPG or IPG signals. One example for an interactive (television) program guides is as follows: A method or apparatus for transferring recorded programs (or recording programs) using an interactive (television) program guide implemented on user video or television equipment, wherein the method or apparatus comprises any combination of: displaying on a display screen at least one program listing related to at least one program; enabling a user to select a program entry from the at least one displayed program listing; recording the selected program related to the at least one displayed program listing on a digital storage device; displaying at least one recorded program listing for at least one program recorded on the digital storage device, wherein the at least one recorded program listing includes a recorded program entry for the program recorded on the digital storage device; enabling the user to select the program recorded to transfer the recorded program from the digital storage device to a secondary (or to another portion of the primary or (the) digital storage) device; transferring the recorded program from the digital storage device to a secondary storage device; enabling the user to select a sequence of programs recorded on the digital storage device; and or transferring the sequence of programs to the secondary storage device.

This disclosure is illustrative and not limiting. For example, an embodiment need not include all blocks illustrated in any of the figures. A subset of blocks within any figure may be used as an embodiment. Further modifications will be apparent to those skilled in the art in light of this disclosure and are intended to fall within the scope of the appended claims.

What is claimed is:

1. Apparatus for providing a content control signal and one or more of the following; a video program, a metadata signal, an interactive programming guide (IPG) signal, an electronic programming guide (EPG) signal, comprising:
a circuit for receiving the video program, the metadata, IPG, or EPG signal from a digital delivery network,
a circumvention device which normally removes pseudo sync pulses when the pseudo sync pulses are inserted two or more television lines after the post equalizing pulse so as to allow copying in a video recorder;
a waveform generating circuit for providing a content control signal including pseudo sync pulses added less than two television lines after a post equalizing pulse of the video signal, to provide a content protected video signal;
wherein when the content protected video signal is coupled to the circumvention device, the circumvention device fails in its intended function of removing the pseudo sync pulses in a television field, which results in failure to allow copying in a video recorder; and
wherein the apparatus allows the display of the IPG or EPG signal(s).

2. The apparatus of claim 1 wherein an IPG or EPG signal provides an IPG/EPG including a plurality of television program listings, each listing including title, telecast time, and channel.

3. The apparatus of claim 2 wherein the titles of the program listings displayed on a monitor screen are in a grid guide format of time and channel.

4. The apparatus of claim 3 comprising moving a cursor on the screen to mark one of the displayed titles in the grid guide format.

5. The apparatus of claim 4 comprising opening to the marked title in a single channel format instead of the grid guide format.

6. The apparatus of claim 5 wherein the single channel format includes rows or columns of sequential television program listing for the channel corresponding to the marked title.

7. The apparatus of claim 6 further comprising moving the cursor on the screen to mark a different displayed title in the single channel format.

8. The apparatus of claim 1 further comprising a recording device, wherein the IPG is utilized for transferring recorded programs or recording programs.

9. The apparatus of claim 8 wherein the IPG provides displaying on a display screen at least one listing related to at least one program, enabling a user to select a program entry from the at least one displayed program listing, recording the selected program related to the at least one displayed program listing on a digital device.

10. An integrated circuit for providing a video content control or copy protection signal for a video signal via a circumvention device, wherein the circumvention device normally removes and does not pass pseudo sync pulses when the pseudo sync pulses are inserted two or more television lines after a vertical sync signal so as to allow copying in a video recorder, the integrated circuit comprising:
a sensing/reading circuit for sensing or reading a video content control or copy protection signal that is not resistant to the circumvention device;
a circuit coupled to the sensing/reading circuit for inserting or adding in at least one TV line one or more pseudo sync pulses or one or more pseudo sync pulse/AGC pulse pair signals immediately after or less than two lines after a vertical sync signal or post equalizing pulse to form the video content control or copy protected video signal; and
wherein, when the video content control or copy protected video signal from an output of the integrated circuit is coupled to an input of the circumvention device it causes the circumvention device to pass the content control or copy protection signal in a television field at its output, whereby the output of the circumvention device supplies a signal that is effective in terms of content protection or content control for a video recorder or for a content control system.

11. The integrated circuit of claim 10 wherein the at least one TV line includes up to 18 TV lines.

12. The integrated circuit of claim 10 wherein the content protected video signal is a PAL or NTSC or SECAM copy protected video signal.

13. The integrated circuit of claim 10 wherein the circumvention device adds or enhances content protection effectiveness after processing the content protected video signal.

14. The integrated circuit of claim 10 wherein the circumvention device further blanks or distorts a portion of the active video field.

15. The integrated circuit of claim 10 wherein the circumvention device further blanks out color burst signals in one or more TV lines in the active TV field.

16. The integrated circuit of claim 15 wherein one or more TV lines in the active TV field exhibit color distortion.

17. The integrated circuit of claim 10 wherein the content protected video signal provides improved playability when compared to a content protected video signal which starts inserting pseudo sync pulses two or more lines after the vertical sync signal.

18. The integrated circuit of claim 10 wherein the content protection video signal enhances content protection by causing the circumvention device to attenuate and or level shift at least one TV line of the active field.

19. The integrated circuit of claim 10 wherein the content protection video signal provides reduced geometric distortion in a display of the content protected video signal.

20. The integrated circuit of claim 10 wherein the pseudo sync pulses have a different number of pseudo sync pulses from one line to another or a different pseudo sync pulse width from one line to another line.

21. Apparatus for providing a content control signal and a programming guide, comprising;

a circuit for receiving a programming guide signal for display on a monitor;
a generator circuit for providing a content control signal;
a combining circuit for combining the programming guide signal with the content control signal to provide a content protected video signal that includes post equalizing pulses;
wherein the content protected video signal includes pseudo sync pulses added less than two video lines after a post equalizing pulse of the content protected video signal;
wherein a circumvention device normally removes pseudo sync pulses when the pseudo sync pulses are inserted two or more lines after the post equalizing pulse of a video signal; and
wherein when the content protected video signal is connected to the circumvention device, the circumvention device fails to remove the pseudo sync pulses in the video signal.

* * * * *